(12) United States Patent
Ishii

(10) Patent No.: US 10,938,482 B2
(45) Date of Patent: Mar. 2, 2021

(54) OPTICAL TRANSCEIVER

(71) Applicant: Sumitomo Electric Industries, Ltd., Osaka (JP)

(72) Inventor: Kuniyuki Ishii, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/812,472

(22) Filed: Mar. 9, 2020

(65) Prior Publication Data

US 2020/0295836 A1   Sep. 17, 2020

(30) Foreign Application Priority Data

Mar. 11, 2019 (JP) .............................. JP2019-043995

(51) Int. Cl.
| | | |
|---|---|---|
| *H04B 10/00* | (2013.01) | |
| *H04B 10/40* | (2013.01) | |
| *H04J 14/02* | (2006.01) | |
| *H04B 10/80* | (2013.01) | |
| *H04B 10/2581* | (2013.01) | |

(52) U.S. Cl.
CPC ......... *H04B 10/40* (2013.01); *H04B 10/2581* (2013.01); *H04B 10/801* (2013.01); *H04J 14/02* (2013.01)

(58) Field of Classification Search
CPC ........ H04B 10/40; H04B 10/801; H04J 14/02
See application file for complete search history.

(56) References Cited

U.S. PATENT DOCUMENTS

| | | | | |
|---|---|---|---|---|
| 10,634,844 B1* | 4/2020 | Lin | ................... | G02B 6/12019 |
| 2004/0008927 A1* | 1/2004 | Kowalkowski | ...... | G02B 6/4249 385/24 |
| 2005/0018978 A1* | 1/2005 | Nevo | ................... | G02B 6/4246 385/92 |
| 2009/0034915 A1* | 2/2009 | Oki | ...................... | G02B 6/4201 385/92 |
| 2011/0103797 A1* | 5/2011 | Oki | ...................... | G02B 6/4243 398/79 |
| 2012/0237171 A1* | 9/2012 | Oki | ...................... | G02B 6/4277 385/78 |

(Continued)

FOREIGN PATENT DOCUMENTS

JP            2012-215838 A      11/2012

*Primary Examiner* — David C Payne
*Assistant Examiner* — Pranesh K Barua
(74) *Attorney, Agent, or Firm* — Baker Botts L.L.P.; Michael A. Sartori

(57) ABSTRACT

An optical transceiver according to an embodiment includes a plurality of optical sub-assemblies, a circuit board, an optical receptacle, a WDM module, support member and a housing including the plurality of optical sub-assemblies, the circuit board, the optical receptacle, the WDM module, and the support member. The transmission sleeve and the reception sleeve have respective protrusions coupled to the plurality of first internal fibers in one to one. The housing has holes configured to allow the transmission sleeve and the reception sleeve for being inserted to the housing. The support member has a retaining part configured to retain the protrusions of the transmission sleeve and the reception sleeve for positioning the transmission sleeve and the reception sleeve.

6 Claims, 20 Drawing Sheets

(56) References Cited

U.S. PATENT DOCUMENTS

| | | | |
|---|---|---|---|
| 2012/0237223 A1* | 9/2012 | Matsui | G02B 6/4274 |
| | | | 398/82 |
| 2013/0051733 A1* | 2/2013 | Gallegos | G02B 6/3879 |
| | | | 385/76 |
| 2015/0185423 A1* | 7/2015 | Matsui | G02B 6/3893 |
| | | | 385/77 |
| 2016/0103286 A1* | 4/2016 | Matsui | H01S 3/06754 |
| | | | 398/139 |
| 2017/0168252 A1* | 6/2017 | Pezeshki | G02B 6/428 |
| 2018/0017745 A1* | 1/2018 | Lin | G02B 6/4246 |
| 2020/0168655 A1* | 5/2020 | Wang | G02B 6/12011 |

* cited by examiner

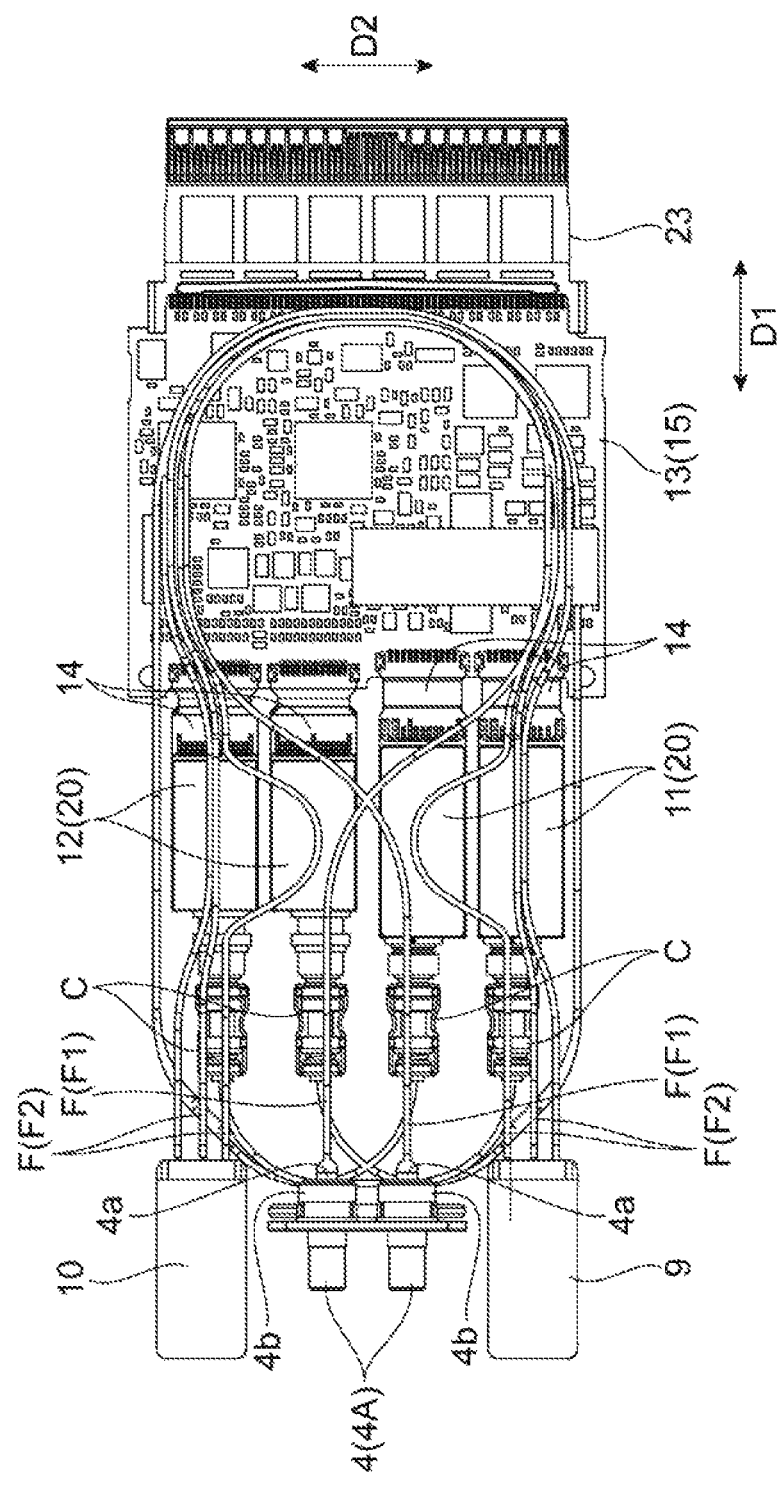

OPTICAL TRANSCEIVER

TECHNICAL FIELD

An aspect of the present disclosure relates to an optical transceiver.

BACKGROUND

Japanese Unexamined Patent Publication No. 2012-215838 describes an optical transceiver. The optical transceiver includes a housing, an optical receptacle assembly, a plurality of TOSAs and a plurality of ROSAs, an optical-multiplexer and an optical-demultiplexer, a plurality of optical fibers. The optical receptacle assembly is provided at one end of the housing. The plurality of the TOSAs and the plurality of ROSAs are housed in the inside of the housing. In this optical transceiver, four the TOSAs produce four optical signals different from each other based on electrical signals. The optical signals individually produced from these four TOSAs are multiplexed into one optical signal by the optical-multiplexer. In this optical transceiver, the multiplexed optical signal is transmitted to the optical-demultiplexer, and the optical-demultiplexer decomposes the multiplexed optical signal into four optical signals having different wavelengths.

To the optical-multiplexer and the optical-demultiplexer, one ends of optical fibers are individually coupled. To the other end of the optical fiber, a plurality of optical receptacles of the optical receptacle assembly is coupled. The optical receptacle assembly has the plurality of optical receptacles, a plurality of tubular sleeves provided on the tip ends the optical fibers, and a pressing member that presses the sleeves. The optical receptacle includes a pair of ports, and into the pair of ports, the plurality of sleeves is individually inserted.

The sleeves each have a tip end portion, and a flange part located on the optical fiber side from the tip end portion. The flange part of each of the sleeves is sandwiched between the pressing member and the optical receptacle. In the optical transceiver described above, the pressing member presses the sleeve by sandwiching the flange part of each of the sleeves. However, the optical-fiber-side portion of the sleeve from the flange part is not pressed, and the optical fiber extends from the sleeve to the opposite side of the tip end portion.

SUMMARY

An optical transceiver according to an aspect of the present disclosure includes a plurality of optical sub-assemblies configured to perform photoelectric conversions from incoming optical signals to incoming electrical signals, and/or to perform photoelectric conversions from outgoing electrical signals to outgoing optical signals; a circuit board electrically connected to the plurality of the optical sub-assemblies; an optical receptacle having a transmission sleeve and a reception sleeve, the transmission sleeve being configured to transmit an outgoing wavelength division multiplexing (WDM) signal, the reception sleeve being configured to receive a incoming WDM signal; a WDM module having a plurality of first internal fibers and a plurality of second internal fibers, the WDM module being optically coupled to the optical receptacle though the plurality of the first internal fibers and optically coupled to the plurality of optical sub-assemblies through the plurality of second internal fibers, the WDM module being configured to multiplex the outgoing optical signals to the outgoing WDM signal, and/or to demultiplex the incoming WDM signal to the incoming optical signals; a support member configured to support the plurality of optical sub-assemblies and to be fixed to the circuit board; and a housing including the plurality of optical sub-assemblies, the circuit board, the optical receptacle, the WDM module, and the support member. The transmission sleeve and the reception sleeve have respective protrusions coupled to the plurality of first internal fibers in one to one. The housing has holes configured to allow the transmission sleeve and the reception sleeve for being inserted to the housing. The support member has a retaining part configured to retain the protrusions of the transmission sleeve and the reception sleeve for positioning the transmission sleeve and the reception sleeve.

BRIEF DESCRIPTION OF THE DRAWINGS

FIG. 10 is a plan view showing the components of the optical transceiver shown in FIG. 1;

DETAILED DESCRIPTION

The Detail of an Embodiment

Figure 1:
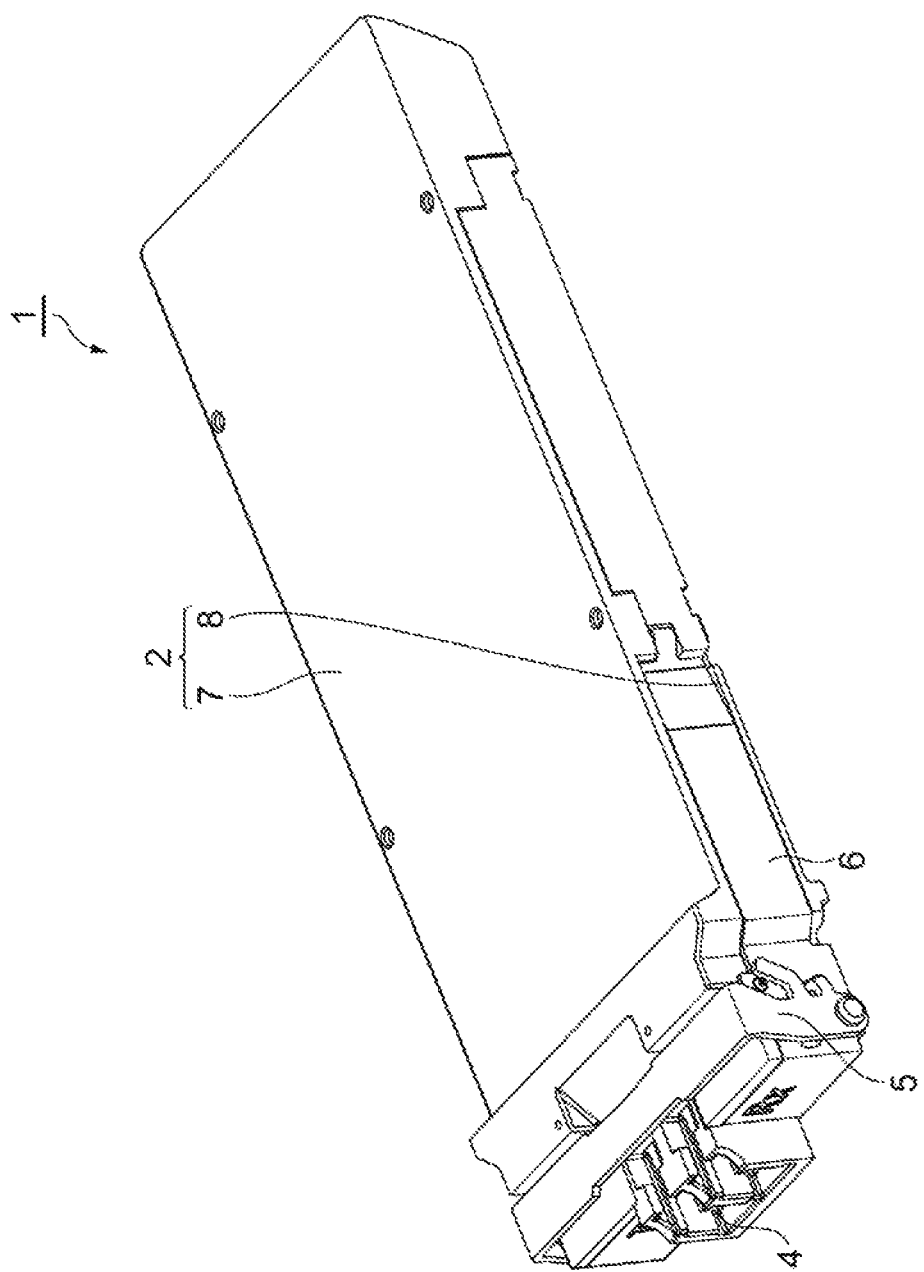
FIG. 1 is a perspective view showing an optical transceiver according to an embodiment of the present disclosure.

In the following, a specific example of an optical transceiver according to the embodiment will be described with reference to the drawings. Note that the present invention is not limited to examples below, and the present invention is to include all modifications in the scope shown in claims and equivalent to claims. In the following description, in the description of the drawings, the same or corresponding components are designated with the same reference signs, and the duplicate description is appropriately omitted. In regard to the drawings, the drawings are sometimes simplified or exaggerated for easy understanding, and dimensions, ratios, and other parameters are not limited to those described in the drawings.

FIG. 1 is a perspective view showing an optical transceiver 1 according to an embodiment. The optical transceiver 1 is inserted into and removed from a cage provided in the inside of a host system (communication device). The optical transceiver 1 is a so-called CFP8 module. In regard to the CFP8 module, its standard specifications are defined in the industry of the optical transceiver. In the optical transceiver 1, the NRZ signal having a signal speed of 25 Gbps is multiplexed to a four-value PAM (Pulse Amplitude Modulation) signal, i.e., a PAM4 signal (multiplicity 2).

For example, in the inside of a TOSA, described later, one semiconductor laser is driven according to a PAM4 signal, and thus the transmission rate is increased to 50 Gbps per wavelength. One TOSA is mounted with four semiconductor lasers, and outputs four optical signals having different wavelengths different from each other. In the following, a signal path between a plurality of electrical signals that is inputted to and outputted from the optical transceiver 1 and the optical signal having one wavelength corresponding to the plurality of electrical signals is referred to as a lane.

One TOSA can handle four lanes, and performs signal transmission at 200 Gbps (50 Gbps×four wavelengths). One ROSA includes four lanes that convert a single optical signal into a single electrical signal, and performs transmission at 200 Gbps similarly to the TOSA. Therefore, the CFP8 module mounted two OSAs (the general term of the TOSA and the ROSA) having a transmission rate of 200 Gbps, and the CFP8 module handles eight lanes in total on the transmission side and the reception side, and achieves a transmission capacity of 400 Gbps.

The optical transceiver 1 includes a housing 2. The housing 2 includes an upper housing 7 and a lower housing 8. The external dimensions of the housing 2 is in compliance with the MSA (Multi-Source Agreement) that is the industry standard. For example, the length of the housing 2 is 106 mm, the width of the housing 2 is 40 mm, and the height of the housing 2 is 9.5 mm. The housing 2 is provided with an optical receptacle 4 that accepts an external optical connector and has a tubular sleeve 4A (see FIG. 2). The sleeve 4A includes a transmission sleeve that transmits an outgoing wavelength division multiplexing signal and a reception sleeve that receives an incoming wavelength division multiplexing signal from the outside. The external optical connector is an LC connector, for example.

In the following, in the drawings, the terms "front and rear", "upper and lower" and "right and left". However, these terms are used for convenience based on the state shown in the drawings. In the following description, the upper is a direction in which the upper housing 7 is provided to the lower housing 8. The front is a direction in which the optical receptacle 4 is provided to the housing 2. The right and left are width directions of the housing 2 vertical to the upper and lower and the front and rear.

The optical receptacle 4 is formed in the center of the lateral direction (the width direction) of the housing 2. On the right and left sides of the housing 2, a veil 5 and a slider 6 are provided. The veil 5 is located above the optical receptacle 4, and rotatably attached to the slider 6. When the veil 5 is rotated frontward and downward, the slider 6 linearly moves frontward. In association with the linear motion of the slider 6 to frontward, the engagement of the optical transceiver 1 with the cage of the host system his released. Therefore, the veil 5 is rotated frontward and downward, and thus the optical transceiver 1 can be removed from the cage. As described above, the height of the housing 2 is about 10 mm, which is the extent that the height is slightly above the width of the slider 6 (in FIG. 1, the length in the vertical direction). Thus, the mount density of the optical transceiver 1 on the host system can be improved.

Figure 2:
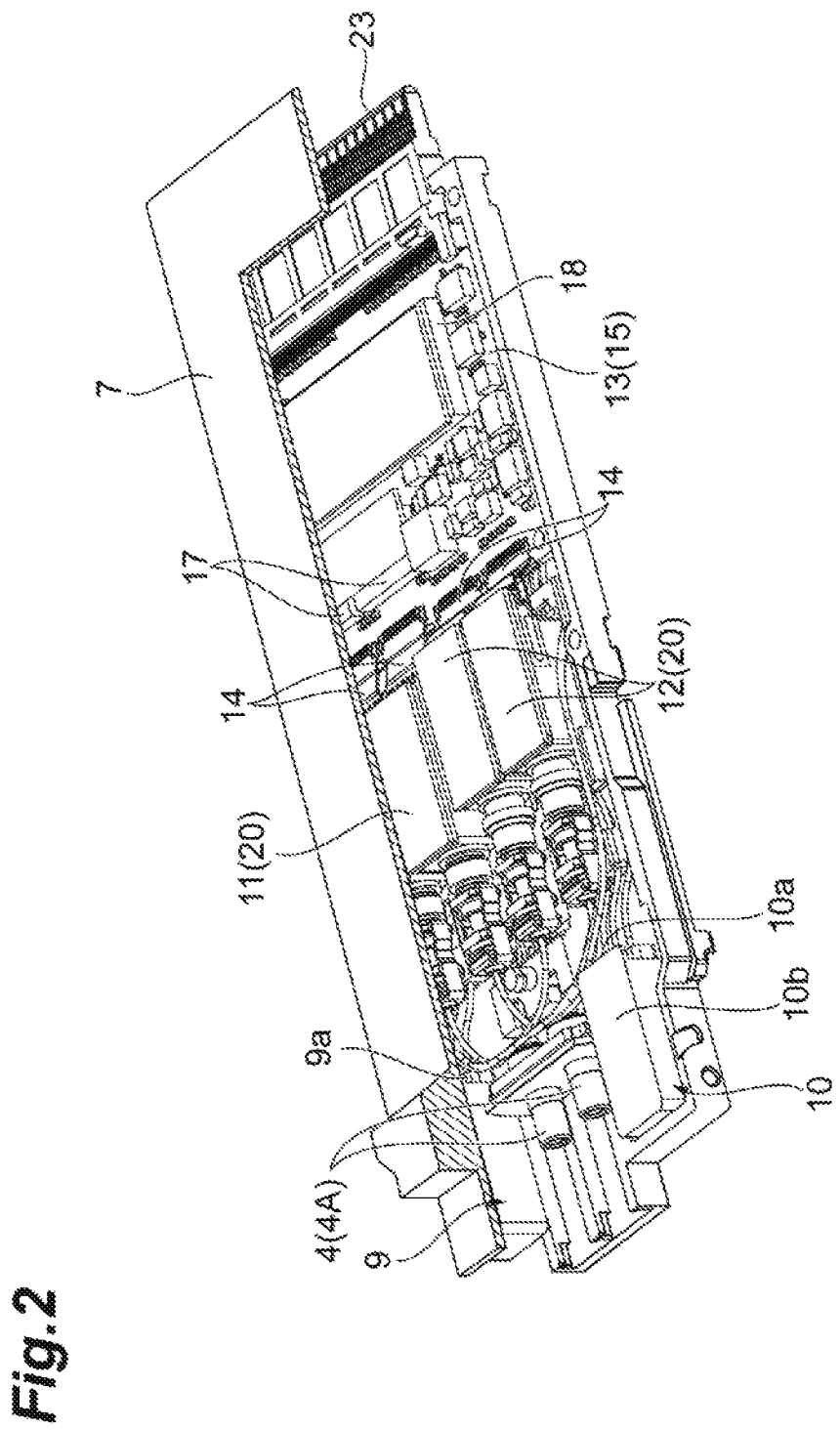
FIG. 2 is a cross-sectional perspective view showing the internal structure of the optical transceiver shown in FIG. 1.
Figure 3:
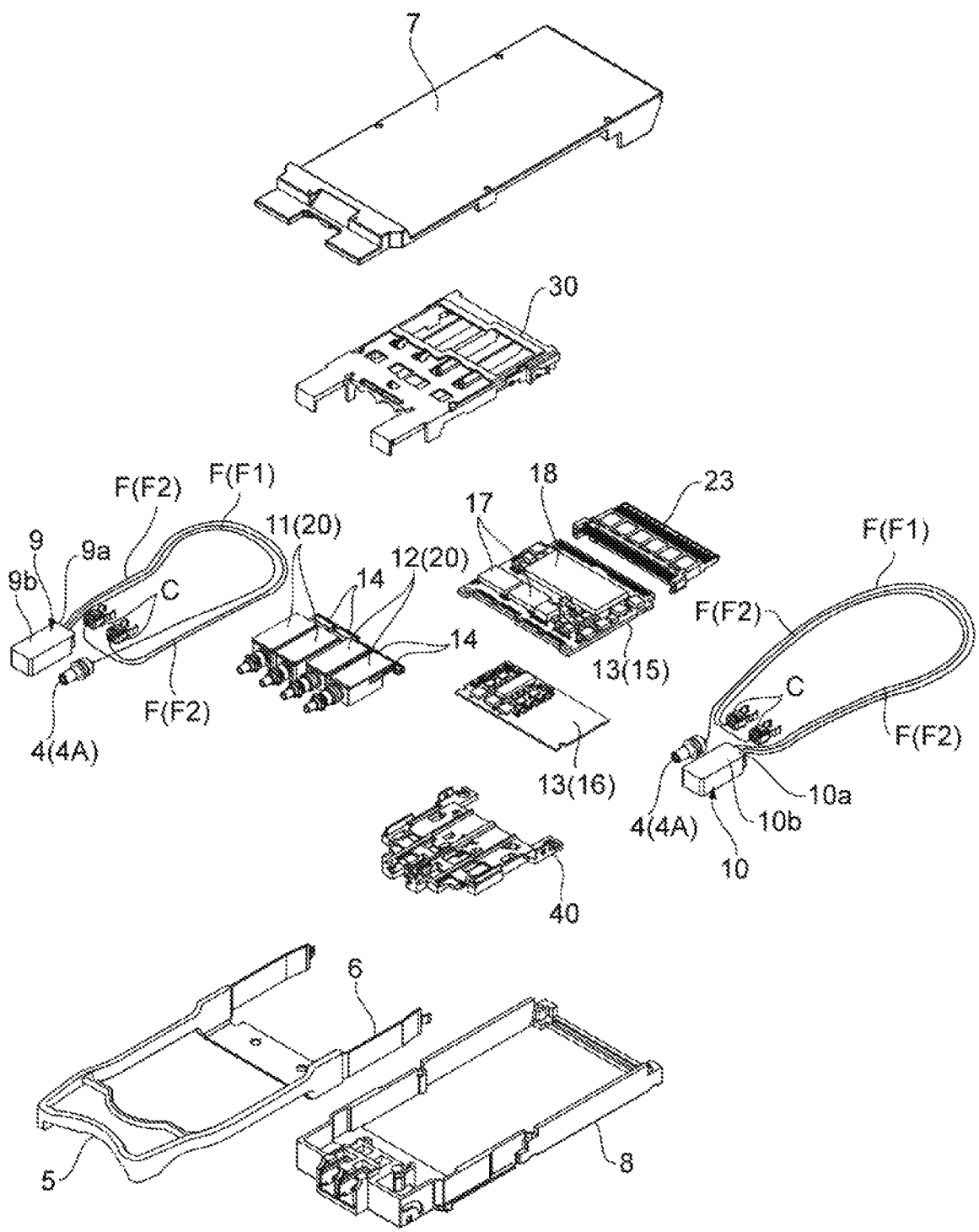
FIG. 3 is an exploded perspective view of the optical transceiver shown in FIG. 1.

FIG. 2 is a cross-sectional perspective view showing the internal structure of the optical transceiver 1, from which a part of the upper housing 7 is cut. FIG. 3 is an exploded perspective view of the optical transceiver 1. The upper housing 7 and the lower housing 8 house the optical receptacle 4, an optical-multiplexer (O-Mux) 9 and an optical-demultiplexer (O-DeMux) 10 respectively located on the right and left sides of the optical receptacle 4, a TOSA 11, a ROSA 12, a circuit board (printed wiring board) 13, and an FPC 14. In the present disclosure, the optical-multiplexer 9 and the optical-demultiplexer 10 are sometimes collectively referred to as the optical-multiplexer/demultiplexer (WDM module).

As described above, the optical transceiver 1 handles optical signals having wavelengths different from each other in eight lanes at a transmission unit. The optical transceiver 1 handles optical signals having wavelengths different from each other in eight lanes at a reception unit. The optical-demultiplexer 10 separates a wavelength division multiplexing optical signal on which optical signals in eight lanes are multiplexed into a sub-wavelength division multiplexing optical signal on which four lanes on the long wavelength side are multiplexed and a sub-wavelength division multiplexing optical signal on which four lanes on the short wavelength side are multiplexed. That is, the optical-demultiplexer 10 demultiplexes an incoming wavelength division multiplexing signal to generate single optical signals. At the reception unit, these two sub-wavelength division multiplexing optical signals are optically coupled to the ROSA 12. The optical-multiplexer 9 multiplexes these two sub-wavelength division multiplexing optical signals (in four lanes) into a single wavelength division multiplexing optical signal (in eight lanes). That is, the optical-multiplexer 9 multiplexes single optical signals to generate an outgoing wavelength division multiplexing signal. At the transmission unit, these two sub-wavelength division multiplexing optical signals are optically coupled to the TOSA 11. In the following description, the TOSA 11 and the ROSA 12 are sometimes referred to as the OSA (optical sub-assembly) 20 as a general term.

The optical receptacle 4 is optically coupled to the OSA 20 through an internal fiber F and a simple connector C. FIG. 3 shows a state in which the simple connector C is separated from the OSA 20. To the optical-multiplexer 9, one internal fiber F extending from the sleeve 4A and two internal fibers F going to the TOSA 11 are optically coupled. To the optical-demultiplexer 10, two internal fibers F extending from the ROSA 12 and one internal fiber F going to the sleeve 4A are optically coupled. Here, the term "optically coupled" means that an optical waveguide, an optical coupling system, or the like is configured such that the wavelength division multiplexing optical signal and the sub-wavelength division multiplexing optical signal are appropriately transmitted.

On the rear side of the optical-multiplexer 9 and the optical-demultiplexer 10, two TOSAs 11 and two ROSAs 12 are disposed. These OSAs 20 photoelectrically convert a single optical signal and in to a single electrical signal. To each of the OSAs 20, two internal fibers F extending from the optical-multiplexer 9 or the optical-demultiplexer 10 are optically coupled through the simple connector C. The internal fibers F are optically coupled to the optical coupling units of the OSAs 20. In the inside of the optical coupling unit, optical components, such as a lens and an isolator, are built-in.

The optical-multiplexer 9 and the optical-demultiplexer 10 have the same shape and the same outer dimensions, for example. On a bottom part 9b of the optical-multiplexer 9 and on a bottom part 10b of the optical-demultiplexer 10, the optical-multiplexer 9 may have a projecting part 9a that projects on the rear side, and the optical-demultiplexer 10 may have a projecting part 10a that projects on the rear side. However, these projecting parts 9a and 10a may be omitted. From the optical-multiplexer 9 and the optical-demultiplexer 10, three internal fibers F are drawn out in a pigtail mode. The internal fiber F is directly optically coupled to the optical system in the inside of the optical-multiplexer 9 or the optical-demultiplexer 10 and the optical receptacle 4. The internal fibers F drawn out in the pigtail mode are integrally connected to the optical-multiplexer 9 or the optical-demultiplexer 10, and are not easily removed.

The internal fiber F includes a first internal fiber F1 and a second internal fiber F2. The optical-multiplexer 9 and the optical-demultiplexer 10 are optically coupled to the optical receptacle 4 through the first internal fiber F1. The optical-multiplexer 9 and the optical-demultiplexer 10 are connected to the simple connector C (the OSA 20) through the second internal fiber F2. In the following description, in the case in which the first internal fiber F1 is distinguished from the second internal fiber F2 for description, these are referred to as the first internal fiber F1 and the second internal fiber F2, whereas in the case in which the first internal fiber F1 and the second internal fiber F2 are unnecessary distinguished from each other for description, these are collectively referred to as the internal fiber F.

The OSAs 20 are mounted on the circuit board (printed wiring board) 13 through a first support member 30 and a second support member 40, described later. Thus, the electric connection between the FPC 14 and the circuit board 13 connected to the OSAs 20 can be protected (reinforced) against stress. Therefore, the reliability of connection can be improved. On the circuit board 13, circuits electrically connected to the OSA 20 through the FPC 14. The circuit board 13 is disposed on the rear side of the OSA 20.

The circuit board 13 includes a first circuit board 15 located on the upper side and a second circuit board 16 located on the lower side. On the first circuit board 15, two LD drivers 17 facing two TOSAs 11, a DSP (Digital Signal Processor) 18, and a preamplifier IC, and any other component. The DSP 18 is a signal processing IC, and applies signal processing to eight electrical signals on the transmission side and eight electrical signals on the reception side. The DSP 18 converts an NRZ signal at 25 Gbps, for example, into a PAM4 signal.

The second circuit board 16 is electrically connected to the first circuit board 15 located on the upper side by a stack connector. With the use of the stack connector, electric connection can be achieved with space saving, compared with the FPC. The stack connector can also meet relatively high speed transmission of electrical signals. The first circuit board 15 mounts circuit components on both surfaces, for example (dual surface mounting). The second circuit board 16 mounts circuit components on the top surface alone, for example (single surface mounting). The optical transceiver 1 has a plug substrate 23 on the rear side of the circuit board 13, separately from the circuit board 13. The plug substrate 23 engages with an electric connector provided in the inside of the cage of the host system.

In order to reserve the relative position accuracy between the electric connector and the plug substrate 23, the engagement force of the electric connector and the plug substrate 23 has to be improved. The force of insertion and removal of the optical transceiver 1 into and from the electric connector is large. In order not to spread the stress, which is applied to the plug substrate 23 when the optical transceiver 1 is inserted and removed, to the circuit board 13, and in order that the plug substrate 23 firmly engages with the electric connector, the plug substrate 23 is separated such that the plug substrate 23 is a separate substrate from the circuit board 13.

Figure 4:
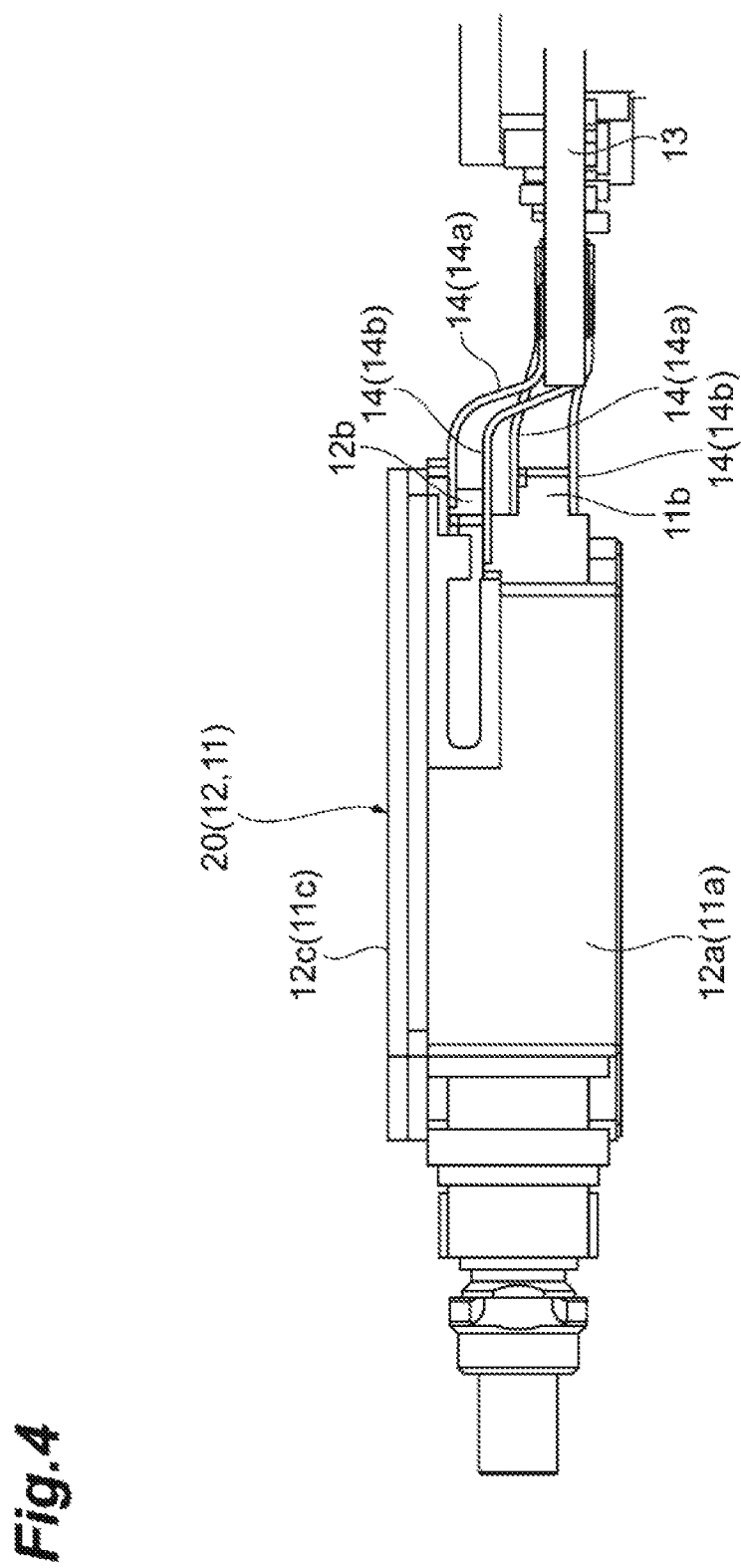
FIG. 4 is a side view showing an OSA, an FPC, and a circuit board.

As shown in FIG. 4, the OSAs 20 has packages 11a and 12a in a rectangular cuboid shape and terminals 11b and 12b drawn out only from the rear side of the packages 11a and 12a. The packages 11a and 12a include terminals 11b and 12b that are located in the longitudinal direction of the optical transceiver 1 and on the opposite side of the optical receptacle 4. Bottom faces 11c and 12c of the packages 11a and 12a contact the inner surface of the upper housing 7. That is, the OSAs 20 are mounted up side down in the inside of the upper housing 7.

Figure 5:
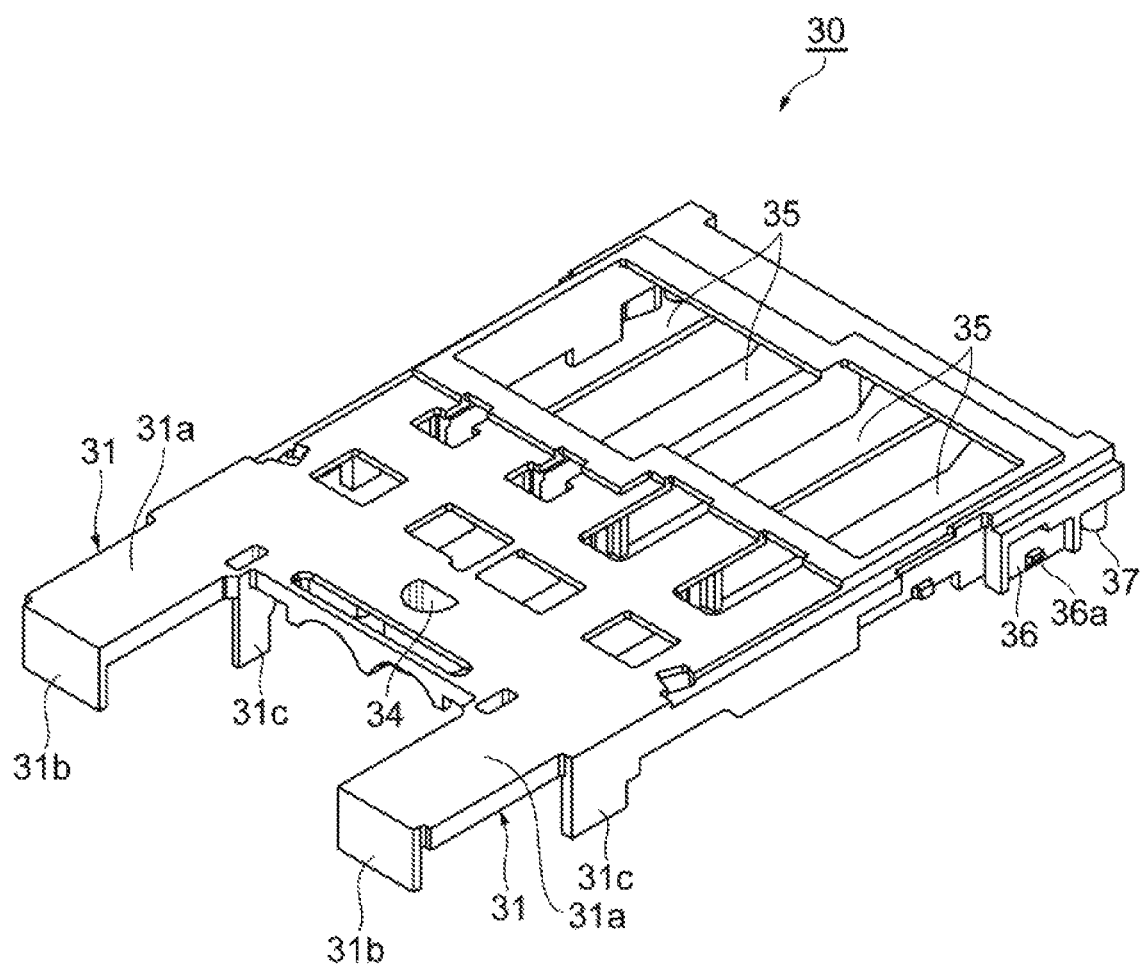
FIG. 5 is a perspective view showing a first support member of the optical transceiver shown in FIG. 1.
Figure 6:
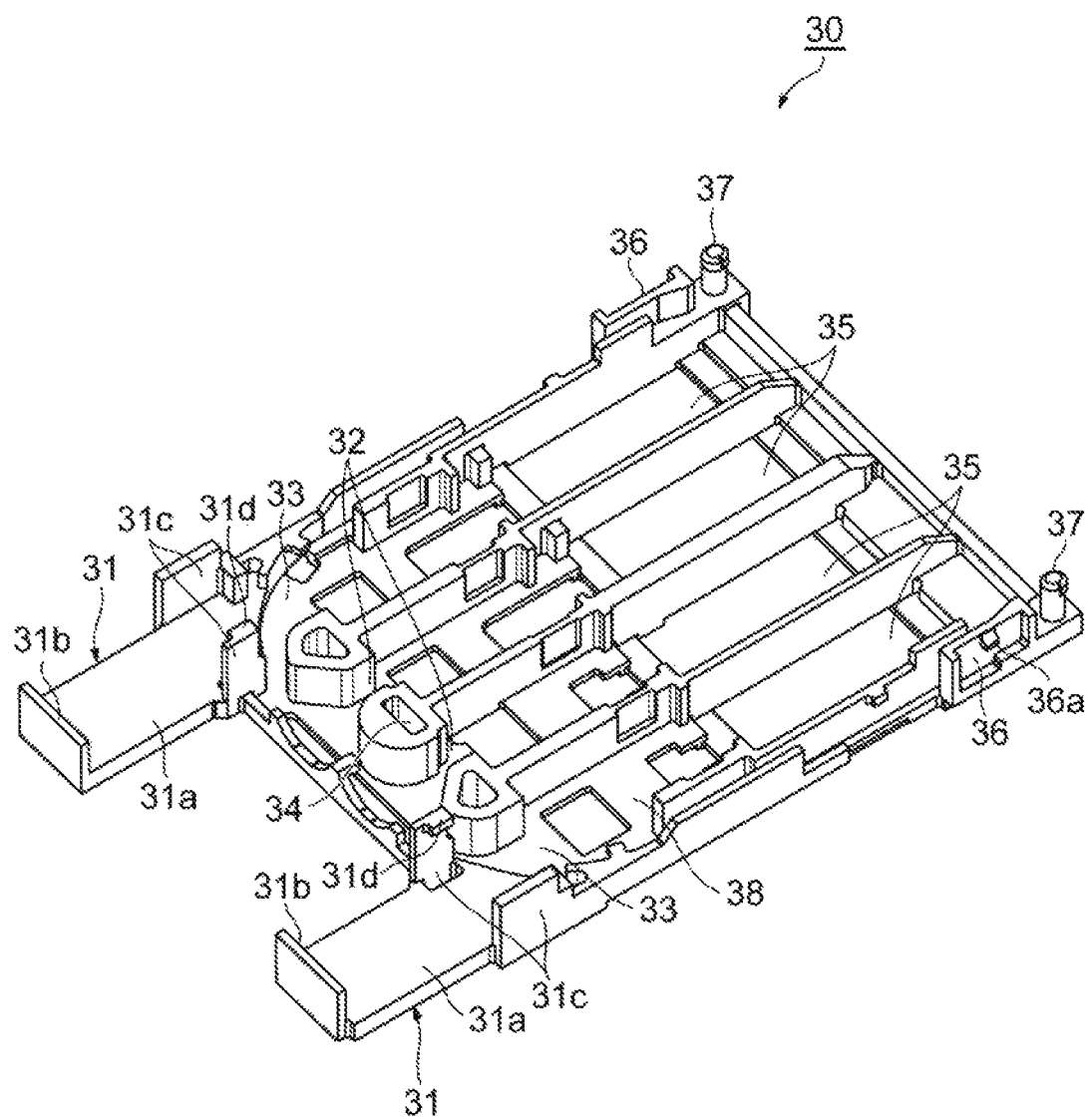
FIG. 6 is a perspective view of the first support member shown in FIG. 5 viewed from the opposite side in FIG. 5.

FIGS. 5 and 6 are perspective views showing the first support member 30. The first support member 30 has its appearance in a rectangular planar shape. The first support member 30 includes a projecting part 31, grooves 32 and 33, holes 34 and 35, an engagement part 36, and a projection 37. The projecting part 31 is provided on the right and left end sides of the first support member 30. The projecting parts 31 are parts that temporarily fix the optical-multiplexer 9 and the optical-demultiplexer 10. Here, the term "temporarily fix" means that in a temporarily fixed state, for example, the optical-multiplexer/demultiplexer is not displaced even though the first support member is obliquely inclined, but the optical-multiplexer/demultiplexer is fixed in strength in which the optical-multiplexer/demultiplexer is manually removed with no tool. The projecting part 31 has a projecting piece 31a that projects frontward, a bent part 31b that is bent at the tip end portion of the projecting piece 31a in the longitudinal direction, and a wall part 31c that is erected in a pair at the base end portion of the projecting piece 31a in the longitudinal direction in the width direction of the projecting piece 31a. One top end of the pair of wall parts 31c, a protrusion 31d that projects on the inner side of the projecting piece 31a in the width direction is provided.

In the assembly of the optical transceiver 1, fixing the optical-multiplexer 9 and the optical-demultiplexer 10 on the projecting parts 31 enables efficient assembly. More specifically, the optical-multiplexer 9 or the optical-demultiplexer 10 is placed on the projecting piece 31a of the projecting part 31, the optical-multiplexer 9 or the optical-demultiplexer 10 is sandwiched between the bent part 31b and the pair of wall parts 31c and pressed by the protrusion 31d, and thus the optical-multiplexer 9 and the optical-demultiplexer 10 are temporarily fixed to the projecting parts 31. The configurations of the optical-multiplexer 9 and the optical-demultiplexer 10 will be described later in detail. On the first support member 30, the optical-multiplexer 9, the optical-demultiplexer 10, and the OSA 20 are integrally temporarily retained, and thus an intermediate assembly M, described later, (see FIG. 18 and any other drawing) is assembled. The intermediate assembly M is assembled, and this improves the efficiency of assembly of the optical transceiver 1.

The grooves 32 and 33 are provided on an inner surface 38 of the first support member 30. The grooves 32 and 33 are guides that dispose the internal fiber F. The grooves 32 and 33 guide the internal fiber F such that the internal fiber F passes a predetermined path. The groove 32 is provided on the right and left inner sides of the first support member 30, and the groove 33 is provided on the right and left outer sides of the first support member 30. Into the grooves 32 and 33, the internal fiber F is inserted, which is drawn out from the optical-multiplexer 9 and the optical-demultiplexer 10, folded over being bent at the rear part, and then extends to the simple connector C.

The hole 34 is a hole that allows the first support member 30 to engage with the second support member 40. The hole 35 exposes the bottom faces 11c and 12c of the OSAs 20 from the first support member 30. The engagement part 36 is provided on the rear parts of the right and left side walls of the first support member 30. The projection 37 is a part that allows the first support member 30 to engage with the circuit board 13, and is provided at the right and left ends of the first support member 30 and near the rear end.

An example of a component that is mounted in the inside of the OSA 20 and that needs heat dissipation is a TEC (Thermo Electric Cooler). The bottom face of the TEC needs heat dissipation in order to emit the quantity of heat which is absorbed when cooling a heat generating semiconductor device by the Peltier effect. Therefore, the bottom faces 11c and 12c of the OSA 20 on which the bottom face of the TEC is located is brought into surface contact with the inner surface of the upper housing 7 penetrating the hole 35, and thus the heat dissipation properties of the OSA 20 can be improved.

The area of the bottom face 11c of the OSA 20 may be greater than the areas of the holes 35. In this case, the falling off of the OSA 20 from the hole 35 is suppressed. However, in this state, a gap is formed between the bottom faces 11c and 12c and the inner surface of the upper housing 7, and the heat dissipation properties are possibly degraded. Therefore, the gap is filled with a gel heat dissipation member, and the thickness of the heat dissipation member is thickened than the thickness (the depth) of the hole 35 of the first support member 30, and thus the OSA 20 is brought into surface contact with the inner surface of the upper housing 7 through the heat dissipation member. Therefore, a heat dissipation path of an excellent thermal conductivity is formed from the OSA 20 to the upper housing 7.

Figure 7:
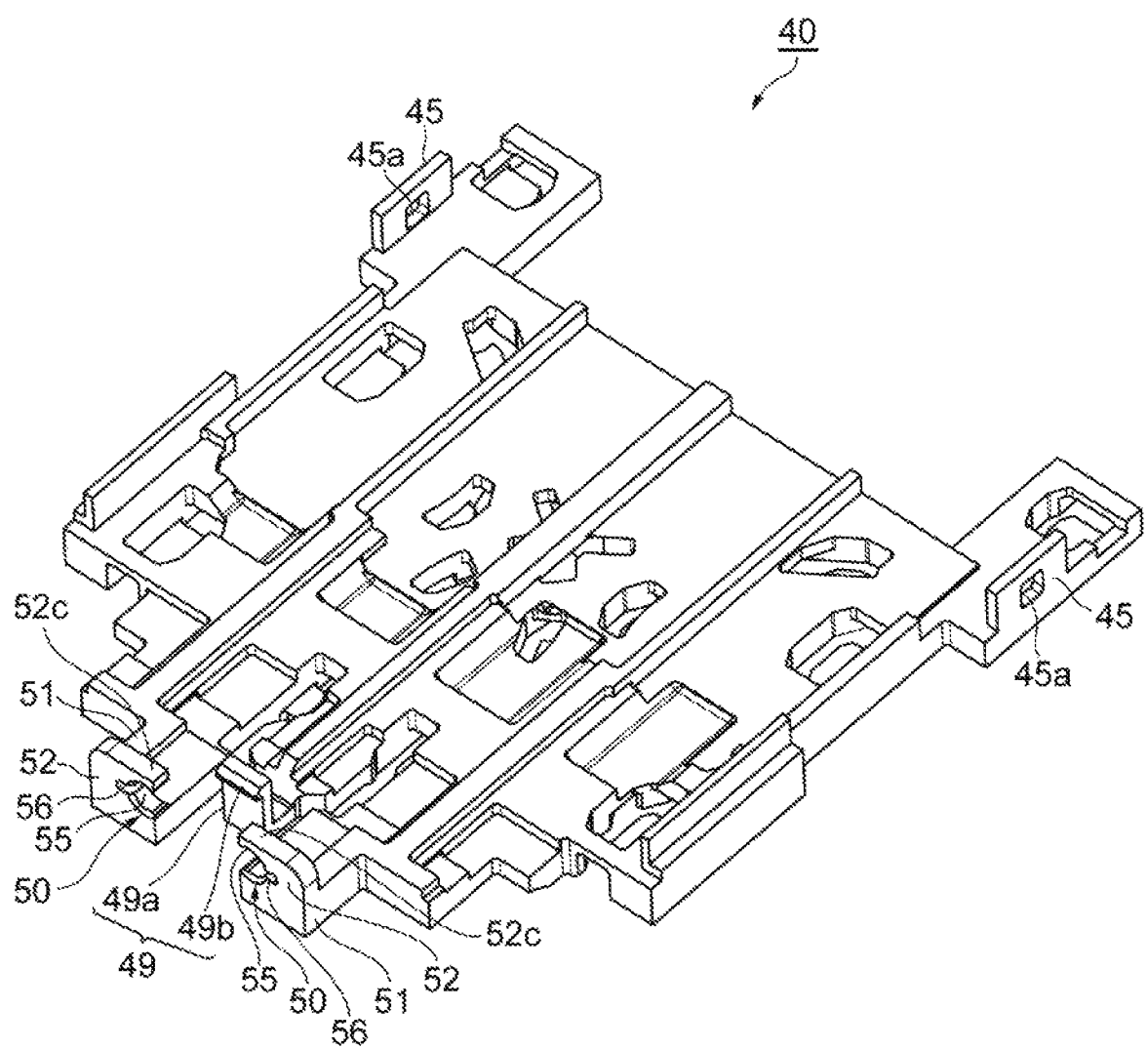
FIG. 7 is a perspective view showing a second support member of the optical transceiver shown in FIG. 1.
Figure 8:
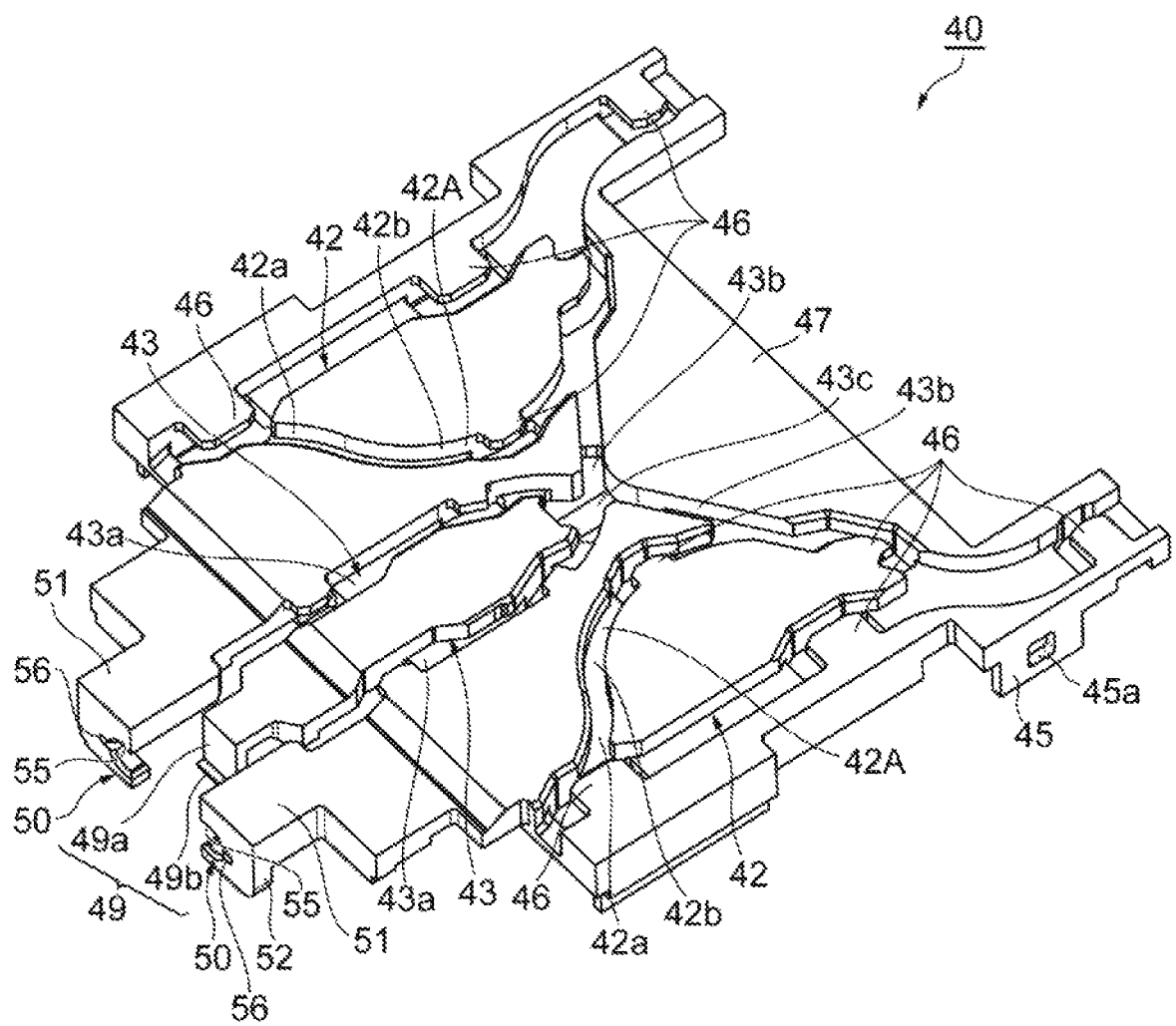
FIG. 8 is a perspective view of the second support member shown in FIG. 7 viewed from the opposite side of FIG. 7.

FIGS. 7 and 8 are perspective views showing the second support member 40. The second support member 40 exhibits the appearance generally in a rectangular planar shape. The second support member 40 includes grooves (guides) 42 and 43 into which the internal fiber F is inserted, a projecting part 45, a nail part 46, a projection 49, and a retaining part 50. The retaining part 50 is a part that retains the sleeve 4A of the optical receptacle 4 described above. The projecting part 45 engages with the engagement part 36 of the first support member 30. The projection 49 engages with the hole 34 of the first support member 30. Therefore, the second support member 40 engages with the first support member 30 at three places, i.e., the projection 49 and a pair of projecting parts 45.

The projecting part 45 has a hole 45a. On the engagement part 36, a projection 36a is formed. The projection 36a is fit into the hole 45a, and thus the first support member 30 and the second support member 40 firmly engage with each other at two places on the rear side. The projection 49 has a first projecting part 49a that projects in the outer direction of the surface of the second support member 40 (in the direction vertical to a plane when the appearance of the second support member 40 is seen in a planar view), and a second projecting part 49b that projects frontward at the end portion of the first projecting part 49a. The second projecting part 49b avoids falling off of the projection 49 from the hole 34. Therefore, with the engagement of the projection 49 with the hole 34, the first support member 30 and the second support member 40 firmly engage with each other at one place on the front side.

The second support member 40 retains the OSA 20 by sandwiching the OSA 20 with the first support member 30. The second support member 40 is assembled on the first support member 30, and the total height of the first support member 30 and the second support member 40 that are assembled, for example, is slightly lower than the total height of the OSA 20. In this case, the bottom faces 11c and 12c of the OSA 20 surely projects from the hole 35 of the first support member 30 on the upper housing 7 side. Therefore, when the total height of the first support member 30 and the second support member 40 is slightly lower than the total height of the OSA 20, the OSA 20 is surely brought into contact with the inner surface of the upper housing 7.

The grooves 42 and 43 are guides that guide the internal fiber F. The grooves 42 and 43 are formed on a bottom face 47 of the second support member 40. The groove 42 is provided in a pair on the right and left outer sides of the second support member 40, and the groove 43 is provided in a pair on the right and left inner sides of the second support member 40. The groove 43 is opposite to the optical receptacle 4, and houses the first internal fiber F1 extending from the sleeve 4A of the optical receptacle 4.

The groove 42 is opposite to the optical-multiplexer 9 and to the optical-demultiplexer 10. The groove 42 guides one first internal fiber F1 and two second internal fibers F2 going to the optical-multiplexer 9 and the optical-demultiplexer 10. The grooves 42 has a detour 42A that goes straight from the front side toward the rear side of the second support member 40 and branches in the midway point. The detour 42A branches at the groove 42, which linearly extends, to the right and left inner sides (the inner side of the optical transceiver 1 in the width direction), extends to the rear side making a curve, and joins the straight part of the groove 42.

A part of the plurality of internal fibers F passes the detour 42A, and the remaining part of the plurality of internal fibers F does not pass the detour 42A, which is disposed along the straight part of the groove 42. Therefore, as the path for the internal fiber F, any one of passing the straight part of the groove 42 or passing the detour 42A can be selected. The radius of curvature of the detour 42A is a value is the minimum bending diameter of the internal fiber F or more. For example, the detour 42A includes a first curved portion 42a in an arc shape having its rotation center on the right and left inner sides of the second support member 40, and a second curved portion 42b in an arc shape having its the rotation center on the right and left outer sides of the second support member 40.

As described above, the first curved portion 42a and the second curved portion 42b are provided, and thus the internal fiber F can be disposed in a state in which the internal fiber F is gently bent on the detour 42A. In the present embodiment, in two second internal fibers F2 of any one of the optical-multiplexer 9 and the optical-demultiplexer 10, one second internal fiber F2 passes the detour 42A. On the other hand, the other second internal fiber F2 and the first internal fiber F1 do not pass the detour 42A, and go straight on the straight part of the groove 42.

The groove 43 includes a first portion 43a that extends from the optical receptacle 4 on the rear side, and a second portion 43b that obliquely extends on the rear end of the first portion 43a and on the rear side of and the right and left end sides of the second support member 40. The second portions 43b of the two grooves 43 form an intersecting part 43c that intersects in the center of the second support member 40, and obliquely extends from the intersecting part 43c on the right and left end sides. The second portion 43b that obliquely extends from the intersecting part 43c on the rear side joins the groove 42 in the midway point.

The nail part 46 is provided on the groove 42 and the groove 43. The nail part 46 suppresses the popping out of the internal fiber F housed in the grooves 42 and 43 from the grooves 42 and 43. The nail parts 46 project from the inner walls of the grooves 42 and 43 on the inner side of the grooves 42 and 43 such that the nail parts 46 block the grooves 42 and 43 at the grooves 42 and 43. For example, the nail part 46 is provided on the front side of the detour 42A, the peak part of the detour 42A extending in a curve, the straight part of the groove 42, and the rear side of the second portion 43b of the groove 43.

The length of the nail part 46 projecting on the inner side of the grooves 42 and 43 is set such that the distance between the tip end of the nail part 46 and the inner wall opposite to the projecting inner wall of the nail part 46 (or the inner walls of the grooves 42 and 43 opposite to the tip end of the nail part 46) is greater than the outer diameter of the internal fiber F. Thus, the internal fiber F can be housed in the grooves 42 and 43 with no interference by the nail part 46 as well as the popping out of the housed internal fiber from the grooves 42 and 43 can be effectively suppressed.

Figure 9A:
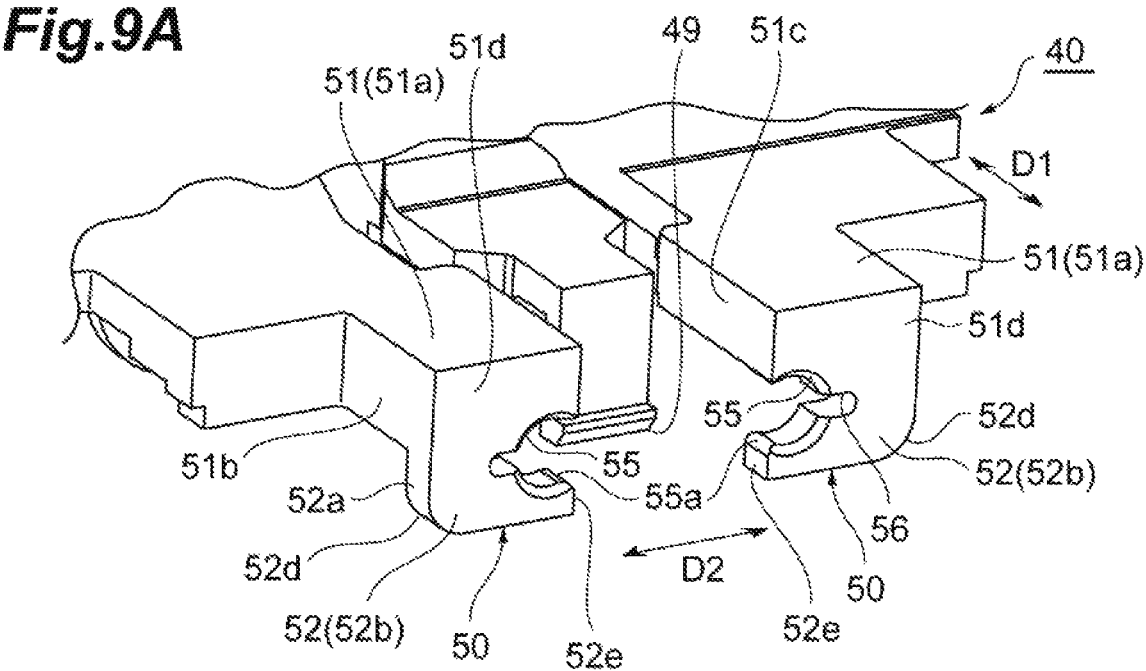
FIG. 9A is a perspective view showing a retaining part of the second support member shown in FIG. 7.

FIG. 9A is a perspective view showing the projection 49 and the retaining part 50 of the second support member 40. As shown in FIGS. 7, 8, and 9A, the retaining part 50 is provided on the front end of the second support member 40, for example. The retaining part 50 has a pair of first projecting parts 51 that projects frontward from the projection 49 on the right and left sides of the projection 49, and a pair of second projecting parts 52 that projects downward at the front end of the first projecting parts 51.

The first projecting parts 51 are in a rectangular cuboid shape, for example. The first projecting parts 51 have a top surface 51a, an outer side surface 51b that faces the outer side of the second support member 40 in a direction D2, an inner side surface 51c that faces the inner side of the second support member 40 in the direction D2, and a front end face 51d that is located at the end portion in a direction D1. The top surface 51a, the outer side surface 51b, the inner side surface 51c, and the front end face 51d are flat surfaces, for example. The second projecting part 52 has an outer side surface 52a that extends from the outer side surface 51b downward, a front end face 52b that is located on the lower part of the front end face 51d, a lower end face 52c that faces downward, a curved surface 52d that extends from the outer side surface 52a to the lower end face 52c, and an inner side surface 52e that extends from the lower end face 52c upward on the opposite side of the outer side surface 52a.

Figure 9B:
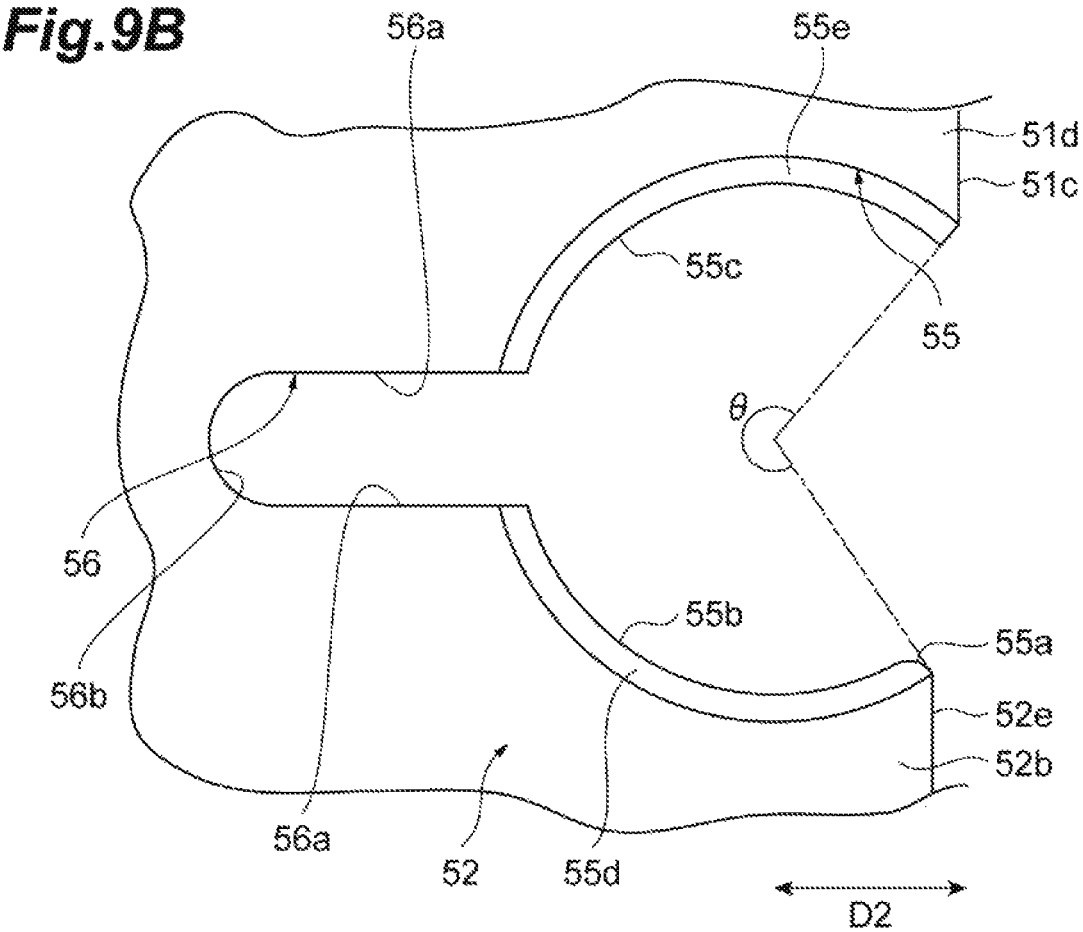
FIG. 9B is an enlarged front view of the retaining part in FIG. 9A.

FIG. 9B is an enlarged view of the front end face 51d and the front end face 52b of the retaining part 50. FIG. 10 is a view showing the components in the inside of the optical transceiver 1. As shown in FIGS. 9A, 9B, and 10, the retaining part 50 further has a notch 55 (arc-shaped gripping part) in an arc shape and a slit 56 that extends from the notch 55 that extends in a direction in which the notch 55 is deep (the inner side to the outer side in the lateral direction). Into the notch 55, a protrusion 4a of the sleeve 4A is fit along the direction D1. The sleeve 4A that is the transmission sleeve of the optical receptacle 4 and the sleeve 4A that is the reception sleeve each include the protrusion 4a. The protrusion 4a is the connecting part of the sleeve 4A to the internal fiber F (the first internal fiber F1), and has a columnar shape, for example. For example, the protrusion 4a is a small outer diameter part having its outer diameter smaller than a flange part 4b of the sleeve 4A.

The notch 55 is defined by a first curved surface 55a that curves on the inner side of the second projecting part 52 in the direction D2, a second curved surface 55b and a third curved surface 55c that curve in an arc shape, a first tapered surface 55d that is inclined from both of the front end face 52b and the second curved surface 55b, and a second tapered surface 55e that is inclined from both of the front end face 51d and the third curved surface 55c. The first curved surface 55a curves from the top end of the inner side surface 52e upward and on the inner side of the second projecting part 52 in the direction D2.

The second curved surface 55b curves in an arc shape from the end portion of the first curved surface 55a on the opposite side of the inner side surface 52e to the slit 56. The third curved surface 55c extends from the lower end of the inner side surface 51c on the inner side of the second projecting part 52 in the direction D2, and curves in an arc shape. The first tapered surface 55d is inclined to both of the front end face 52b and the second curved surface 55b between the front end face 52b and the second curved surface 55b. The second tapered surface 55e is inclined to both of the front end face 51d and the third curved surface 55c between the front end face 51d and the third curved surface 55c.

For example, the radius of curvature of the second curved surface 55b and the radius of curvature of the third curved surface 55c are the same, and the third curved surface 55c is provided on the extension of the second curved surface 55b. A central angle θ of the notch 55 (the second curved surface 55b and the third curved surface 55c) in an arc shape is 180° or more and less than 360°, for example, (as an example, 225° or more and 270° or less). The protrusion 4a of the sleeve 4A fit into the notch 55 is brought into intimate contact with the second curved surface 55b and the third curved surface 55c, for example. The notch 55 is formed in a shape into which the protrusion 4a is easily fit with the first tapered surface 55d and the second tapered surface 55e formed.

The slit 56 further extends from the notch 55 on the outer side of the notch 55, and extends in the direction D2 between the second curved surface 55b and the third curved surface 55c, for example. For example, the second curved surface 55b and the third curved surface 55c are disposed such that the second curved surface 55b and the third curved surface 55c are in symmetry to the slit 56. For example, the slit 56 is defined by a pair of flat surface parts 56a that extends from the notch 55 (from the second curved surface 55b and from the third curved surface 55c) in the direction D2 and a curved surface part 56b that connects the pair of flat surface parts 56a on the opposite side of the notch 55. The slit 56 is provided, and the notch 55 and the slit 56 are easily bent when the protrusion 4a of the sleeve 4A is fit into the notch 55. Thus, the protrusion 4a can be easily fit.

As shown in FIG. 10, the first internal fiber F1 extending from the protrusion 4a of the sleeve 4A goes straight on the rear side, curves on the OSA 20 (the outer surface of the second support member 40) on the opposite side on the right and left, curves greatly on the opposite side on the circuit board 13 along the inner side of the outer edge of the circuit board 13 while maintaining the curvature, passes over the OS As 20 on the right and left outer sides, and is optically coupled to each of the optical-multiplexer 9 and the optical-demultiplexer 10.

The two second internal fibers F2 drawn out from the optical-multiplexer 9 and the optical-demultiplexer 10 go straight on the rear side, being guided by the groove 42. One second internal fiber F2 passes the detour 42A, curves on the inner side of the optical transceiver 1 in the width direction, whereas the other second internal fiber F2 does not pass the detour 42A, and goes straight on the rear side. The two second internal fibers F2 greatly curve in the reverse direction on the right and left on the circuit board 13 along the inner side of the outer edge of the circuit board 13, are drawn out on the front side along the wall part of the engagement part 36 at the rear end of the first support member 30, is bent on the outer side of the wall part provided on the outermost side of the groove 33 of the first support member 30, goes to the rear side, and connected to the simple connector C being respectively guided by the grooves 32 and 33. The second internal fiber F2 is bent along the wall part on the outermost side of the groove 33, and thus the curvature of the bend of the second internal fiber F2 can be suppressed. The curvature of the second internal fiber F2 is smaller than 20 mm, for example.

Next, the connection of the OSA 20 to the circuit board 13 using the FPC 14 will be described. As shown in FIGS. 4 and 10, the FPC 14 includes a first FPC 14a that connects the surfaces of the terminals 11b and 12b (upward surfaces in FIG. 4) to the surface of the circuit board 13 and a second FPC 14b that connects the back surfaces of the terminals 11b and 12b (downward surfaces in FIG. 4) to the back surface of the circuit board 13. The position in the vertical direction at which the terminal 11b is drawn out from the TOSA 11 is different from the position in the vertical direction at which the terminal 12b is drawn out from the ROSA 12. Therefore, any one of the FPC 14 that is connected to the TOSA 11 and the FPC 14 that is connected to the ROSA 12 is formed being imparted with a stress greater than the other due to the difference in the height in the vertical direction to the circuit board 13.

Figure 11:
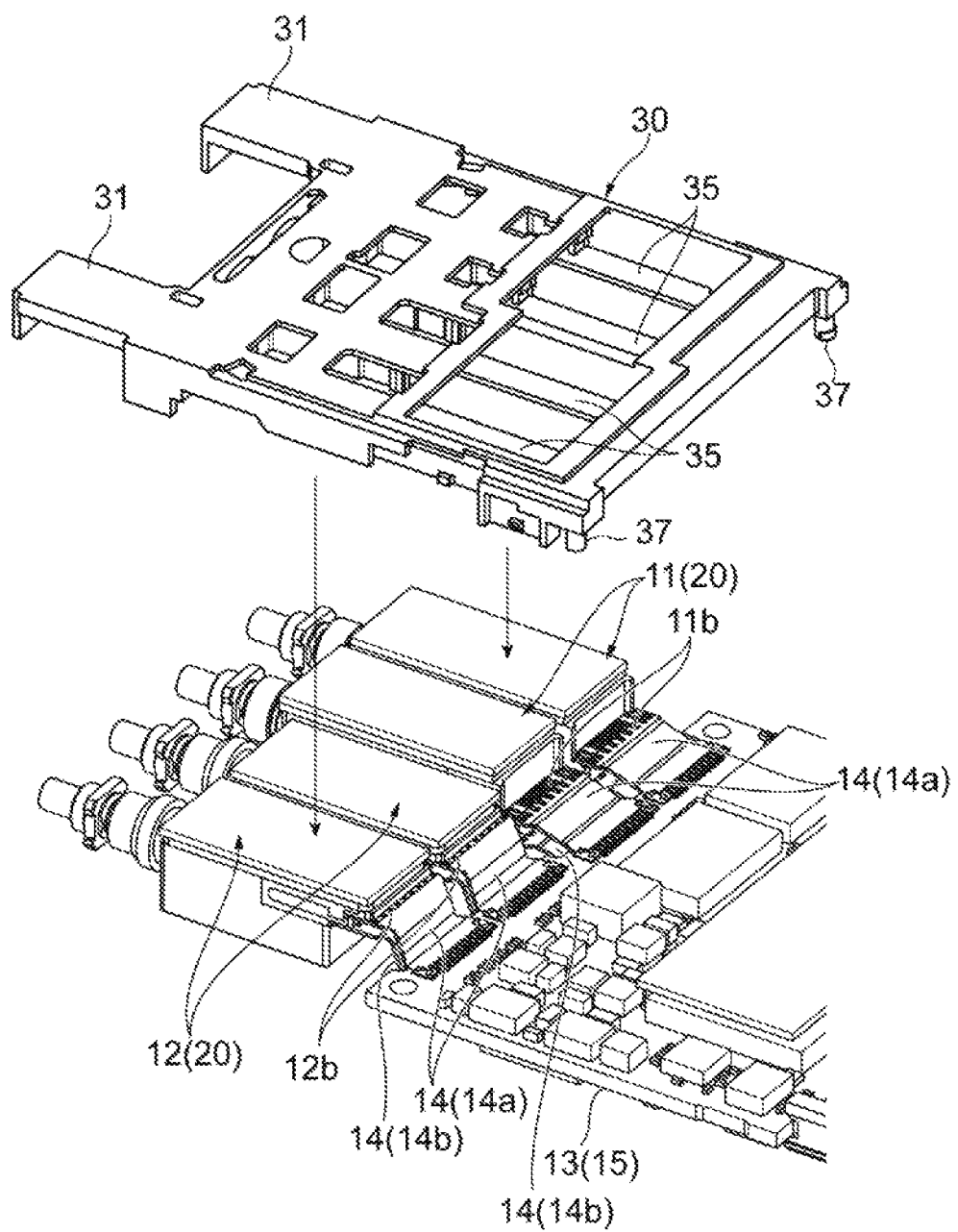
FIG. 11 is a perspective view showing an optical-multiplexer (optical-demultiplexer), a circuit board, and the first support member.

As shown in FIG. 11, in the case in which the difference in the height between the surface of the terminal 12b and the surface of the circuit board 13 is large, a large stress is imparted to the FPC 14 that is connected to the ROSA 12. Note that the reason why this happens is because the positions of the terminal 11b and the terminal 12b in the longitudinal direction are almost the same. The degree of bending necessary to the FPC 14 depends on the positions of the terminals 11b and 12b in the longitudinal direction (or the distance to the circuit board 13) and the difference in the height in the vertical direction between the terminals 11b and 12b to the circuit board 13. When various assembly tasks of the optical transceiver 1 are performed in this state, it is assumed that the moment of a large force is imparted specifically to the FPC 14 connected to the ROSA 12. To this, in the optical transceiver 1, the OSA 20 is mounted on the first support member 30 in assembly, and thus the stress applied to the FPC 14 (the moment due to the weight of the TOSA 11 and the ROSA 12) is relaxed.

Figure 12A:
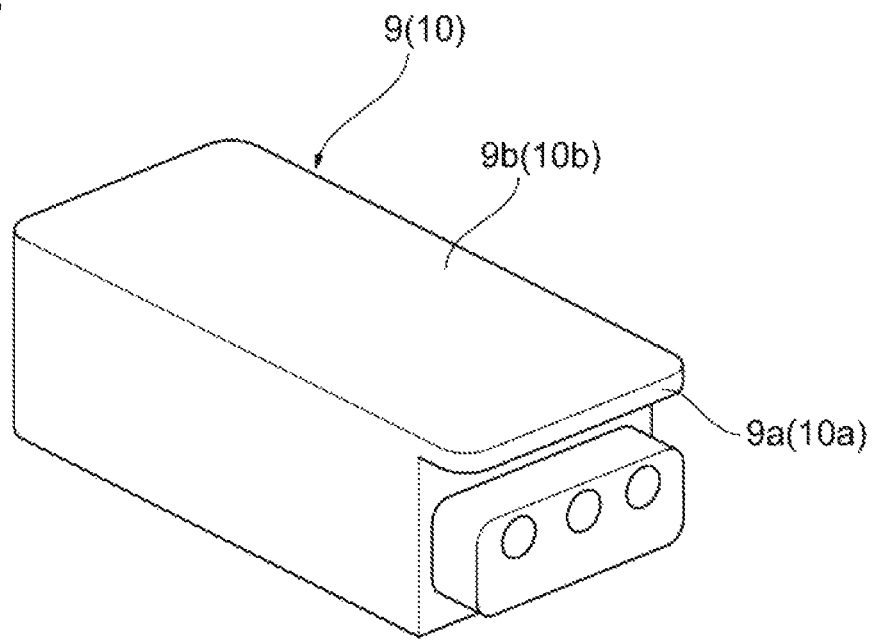
FIG. 12A is a perspective view showing the optical-multiplexer (optical-demultiplexer)
Figure 12B:
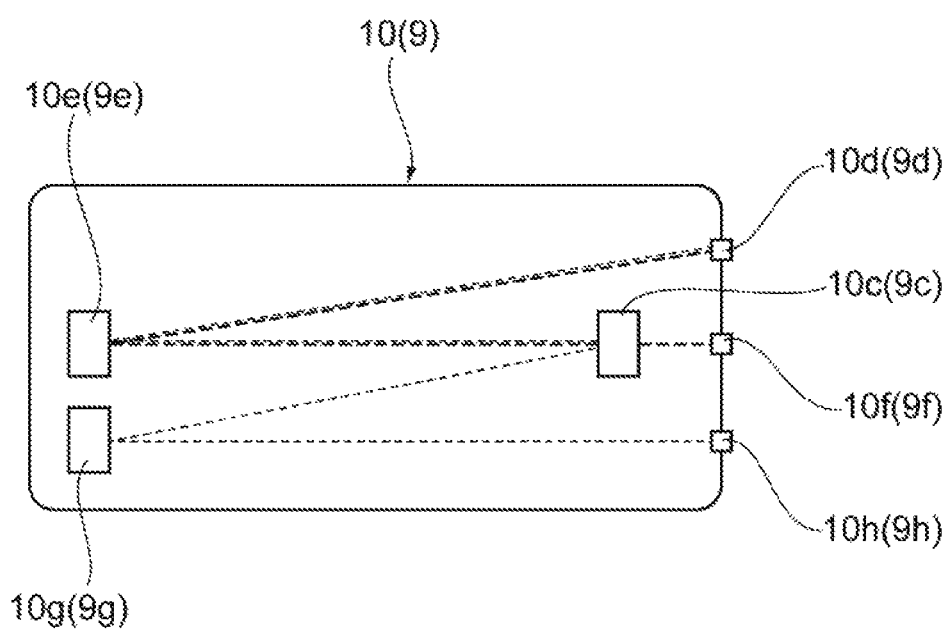
FIG. 12B is a view schematically showing the internal structure of the optical-demultiplexer (the optical-multiplexer)

FIG. 12A is a perspective view showing the appearance of the optical-multiplexer 9. FIG. 12B is a view illustrating the function of the optical-demultiplexer 10. Since the appearance of the optical-demultiplexer 10 is the same as the appearance of the optical-multiplexer 9, the description of the appearance of the optical-demultiplexer 10 is appropriately omitted. The optical-multiplexer 9 is mounted in the inside of the optical transceiver 1 with the bottom part 9b up. The bottom part 9b of the optical-multiplexer 9 is temporarily fixed to the projecting part 31 of the first support member 30, and then the circuit board 13, the OSA 20, the first support member 30, and the second support member 40 are assembled.

As shown in FIG. 12B, the optical-demultiplexer 10 has a wavelength selective filter 10c. The optical transceiver 1 handles optical signals at eight types of wavelengths set at intervals of 4 to 5 nm in the range of 1,274 nm to 1,310 nm. The wavelength selective filter 10c separates a wavelength division multiplexing optical signal on which signal light beams at eight types of wavelengths are multiplexed into optical signals (sub-wavelength division multiplexing optical signals) in four lanes on the long wavelength side (1,310 nm, 1,305 nm, 1,300 nm, and 1,295 nm) and optical signals (sub-wavelength division multiplexing optical signals) in four lanes on the short wavelength side (1,274 nm, 1,278 nm, 1,282 nm, and 1,286 nm).

The wavelength selective filter 10c has a cutoff wavelength between 1,286 nm and 1,295 nm (as an example, 1,290 nm), for example. The wavelength selective filter 10c is obtained in which a dielectric multi-layer film is formed on a base material substantially transparent to the cutoff wavelength. The wavelength selection function of the wavelength selective filter 10c depends on the incident angle of light, i.e., the angle formed by the normal of the wavelength selective filter 10c and the optical axis of the incident light beam (signal light beam). When the incident angle of the light beam is at 0°, the best wavelength selection function is obtained, and the wavelength selection function is more reduced as the incident angle of the light beam becomes large. The term "the wavelength selection function is reduced" means that the difference between the threshold value of the transmission wavelength near the cutoff wavelength and the threshold value of the reflected wavelength, for example, becomes large, and the filter properties are degraded.

In the optical-demultiplexer 10, the wavelength division multiplexing light beam having eight multiplexed wavelengths enters from a port 10d of the optical-demultiplexer 10, totally reflects off a mirror 10e, and then enters the wavelength selective filter 10c. In the wavelength division multiplexing light beam having eight multiplexed wavelengths (the wavelength division multiplexing optical signal), light beams (sub-wavelength division multiplexing optical signals) for four lanes on the long wavelength side (or four lanes on the short wavelength side) are transmitted through the wavelength selective filter 10c, and outputted from a port 10f, whereas light beams (sub-wavelength division multiplexing optical signals) for four lanes on the short wavelength side (or four lanes on the long wavelength side) are reflected off the wavelength selective filter 10c. Four optical signals (sub-wavelength division multiplexing optical signals) reflected off the wavelength selective filter 10c are totally reflected off a mirror 10g, and outputted from a port 10h. At the ports 10d, 10f, and 10h, a collimating lens (not shown) is provided, and in the inside of the optical-demultiplexer 10, a collimate optical system is adopted. That is, the optical signal is reflected off or transmitted in the state of a collimated light beam as described above.

As described above, the optical-demultiplexer 10 is described. However, the optical-multiplexer 9 has the inverted input-output of the optical-demultiplexer 10. That is, optical signals (sub-wavelength division multiplexing optical signals) for four lanes on the long wavelength side (or four lanes on the short wavelength side) enter from a port 9h, are totally reflected off a mirror 9g, and again reflected off a wavelength selective filter 9c. On the other hand, optical signals (sub-wavelength division multiplexing optical signals) for four lanes on the short wavelength side (or four lanes on the long wavelength side) enter from a port 9f, and transmitted through the wavelength selective filter 9c. The signal light beams for four lanes reflected off the wavelength selective filter 9c and the signal light beams for four lanes transmitted though the wavelength selective filter 9c are totally reflected off a mirror 9e, and then outputted as a wavelength division multiplexing optical signal from a port 9d. As described above, the optical components mounted in the inside of the optical-multiplexer 9 can be the same as the optical components mounted in the inside of the optical-demultiplexer 10.

Figure 13:
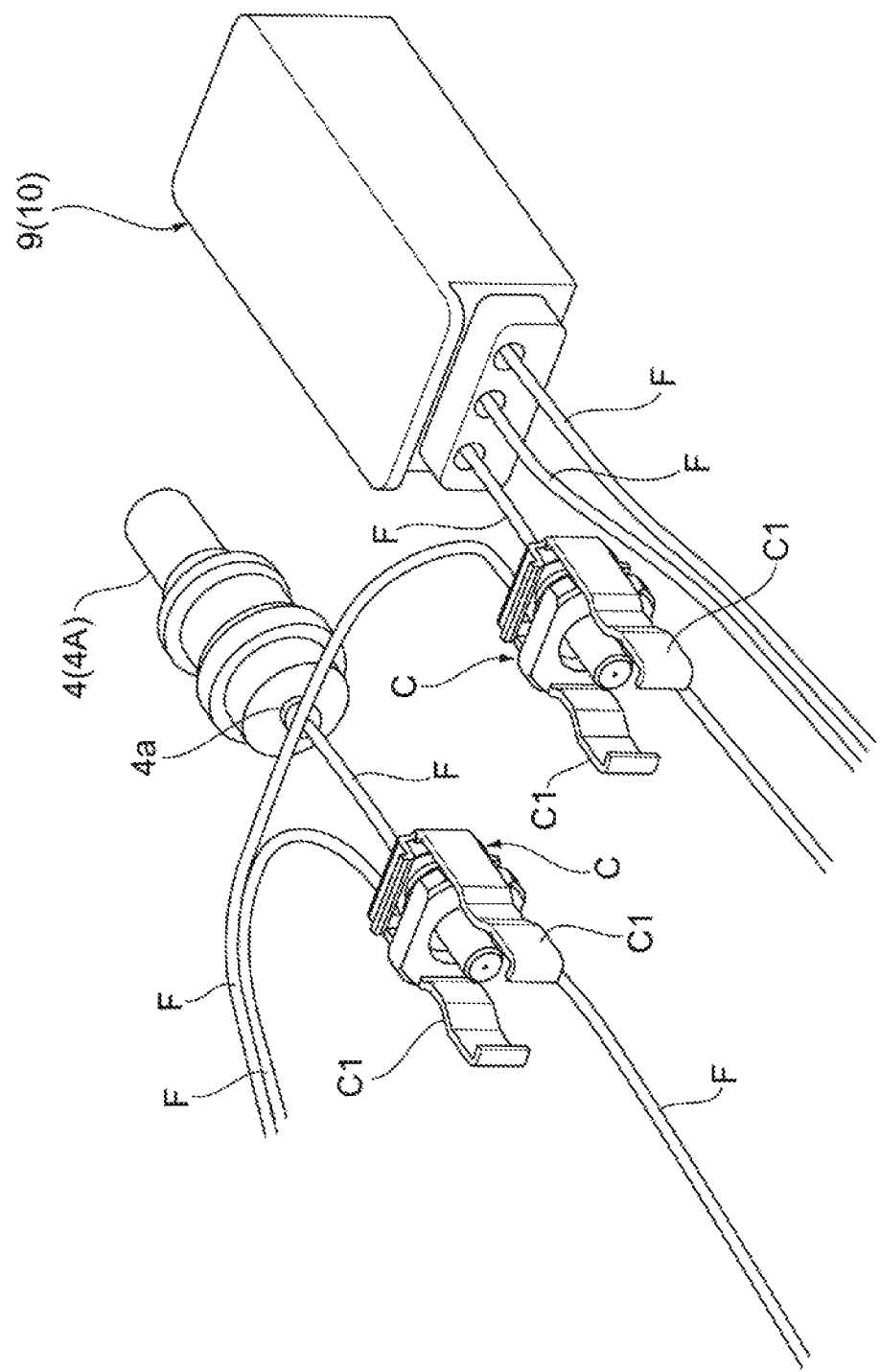
FIG. 13 is a perspective view showing the optical-multiplexer (optical-demultiplexer), an internal fiber, and a simple connector.

FIG. 13 is a perspective view showing the optical-multiplexer 9 (the optical-demultiplexer 10), the sleeve 4A of the optical receptacle 4, the simple connector C, and the internal fiber F. The connection of the optical-multiplexer 9 to the internal fiber F and the connection of the sleeve 4A to the internal fiber F are a so-called pigtail connection (integrated connection). That is, the internal fiber F is directly optically coupled to the optical systems in the inside of the optical-multiplexer 9 and the sleeve 4A. The simple connector C belongs to the OSA 20, and the connection to the OSA 20 and the internal fiber F is performed through the simple connector C. The simple connector C has a hook C1 on its both sides, and the simple connector C is connected to the OSA 20 through the hook C1.

Since the optical-multiplexer 9 (the optical-demultiplexer 10) and the optical receptacle 4 are so-called optically passive components, variations in the performance of the individual components are relatively small. To this, since the OSA 20 is mounted with semiconductor optical elements (active components), such as an LD or PD in its inside, variations in the performance of the individual components are relatively large. Therefore, preferably, the OSA 20 can be easily exchanged, compared with the passive component. Therefore, the OSA 20 is connected using the simple connector C that is easily removed, and thus the OSAs 20 can be independently exchanged in the case in which the characteristics fail.

Figure 14:
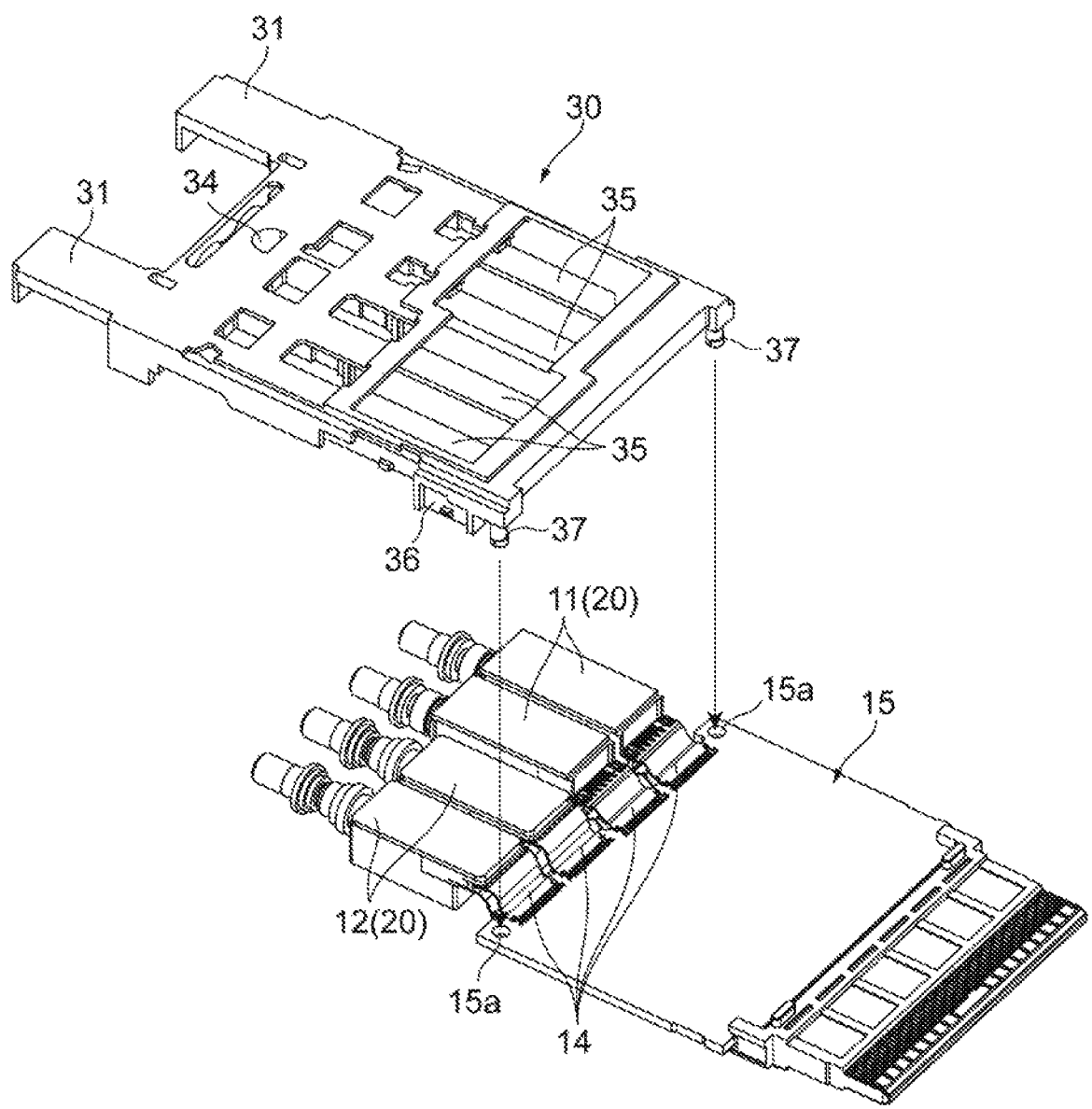
FIG. 14 is a perspective view showing OSAs, FPCs, a circuit board, and the first support member.

Next, the assembly of the optical transceiver 1 will be described. First, as shown in FIG. 14, the first circuit board 15 and the OSA 20 are electrically connected to each other. In detail, he OSAs 20 are electrically connected to the first circuit board 15 on which circuit components are already mounted on both surfaces using the FPCs 14. At this time, the FPCs 14 are formed. More specifically, the flexible part of the FPC 14 that is connected to the ROSA 12 is bent greater than the flexible part of the FPC 14 that is connected to the TOSA 11. After that, the FPCs 14 are soldered to the terminals 11b and 12b of the OSA 20 and the pads of the first circuit board 15 for electrical connection.

Figure 15:
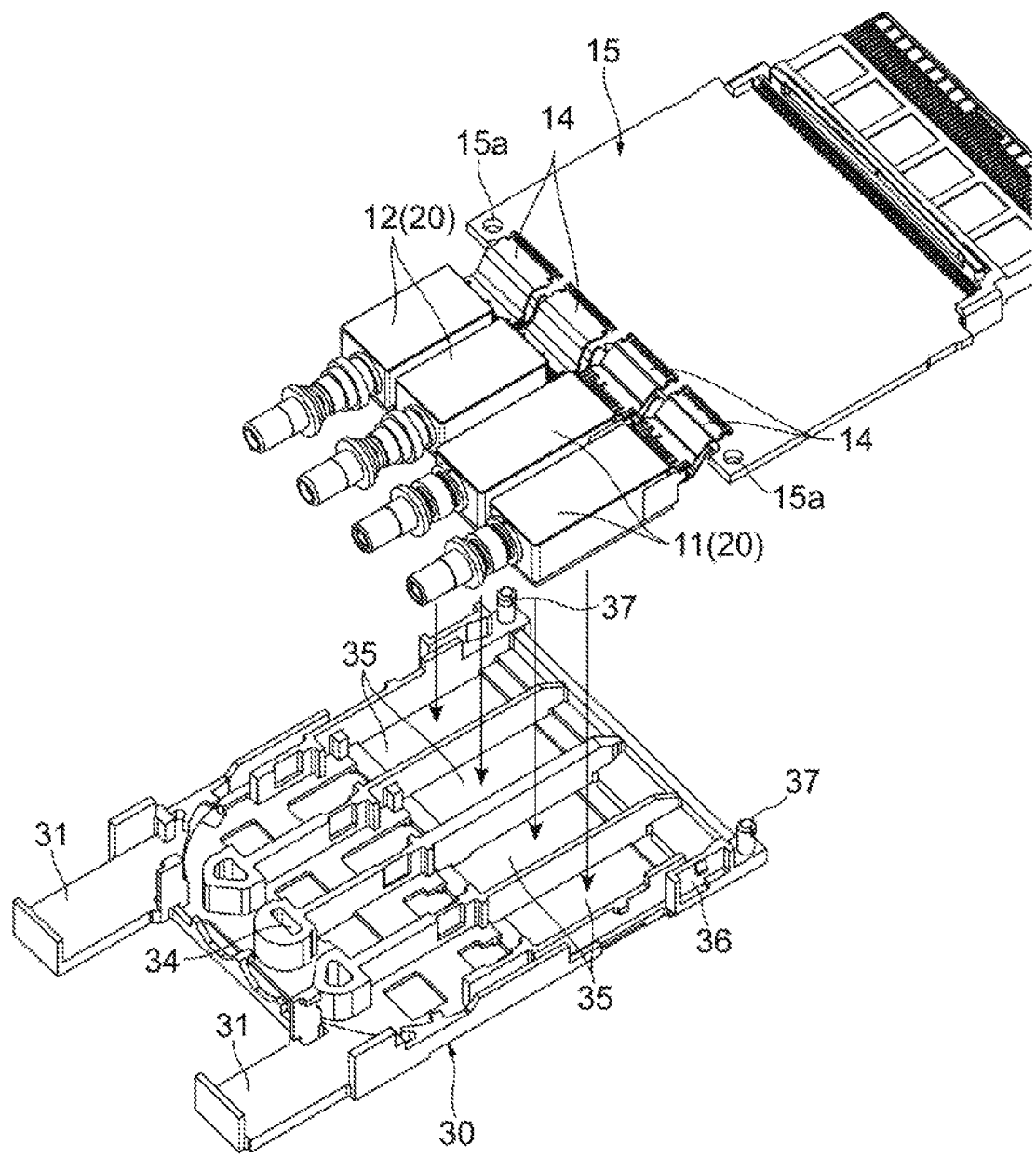
FIG. 15 is a perspective view showing a state in which the first support member is mounted on the circuit board in FIG. 14 viewed from the opposite side in FIG. 14.

Subsequently, as shown in FIGS. 14 and 15, the projection 37 at the rear end of the first support member 30 is inserted (fit) into an opening 15a formed on the first circuit board 15. The projection 37 has the diameter at the tip end set greater than the diameter of the opening 15a, and thus the falling off of the projection 37 from the opening 15a is suppressed. The OSAs 20 is then inserted into the hole 35 of the first support member 30, and the bottom face of the OSAs 20 is exposed from the hole 35.

Figure 16:
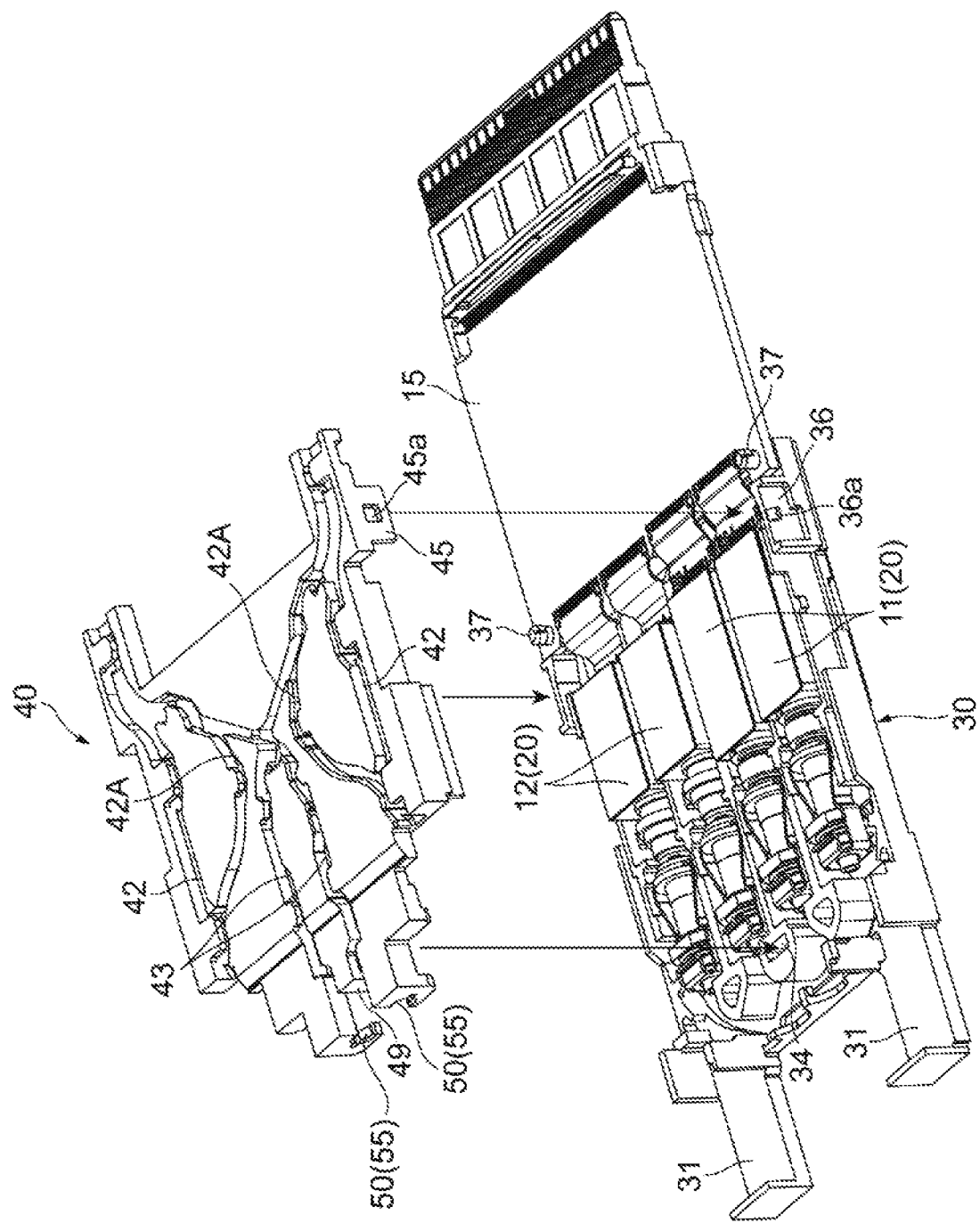
FIG. 16 is a perspective view showing a state in which the second support member is mounted on the first support member in FIG. 15.

As shown in FIG. 16, the second support member 40 is assembled on the first support member 30. At this time, the projections 36a of the first support member 30 are fit into the holes 45a of the second support member 40 as well as the projection 49 of the second support member 40 is fit into the hole 34 of the first support member 30, and thus the second support member 40 firmly engages with the first support member 30.

As shown in FIG. 10, the simple connector C to which the internal fiber F is connected is connected to the sleeves of the OSAs 20. The internal fiber F drawn out frontward from the simple connectors C is housed in the grooves 32 and 33 of the first support member 30, the internal fiber F is curved on the rear side, the internal fiber F extends on the rear side to the portion of the circuit board 13, and at the circuit board 13, the internal fiber F is bent in the reverse direction on the right and left and frontward along the inner side of the outer edge of the circuit board 13.

Figure 17:
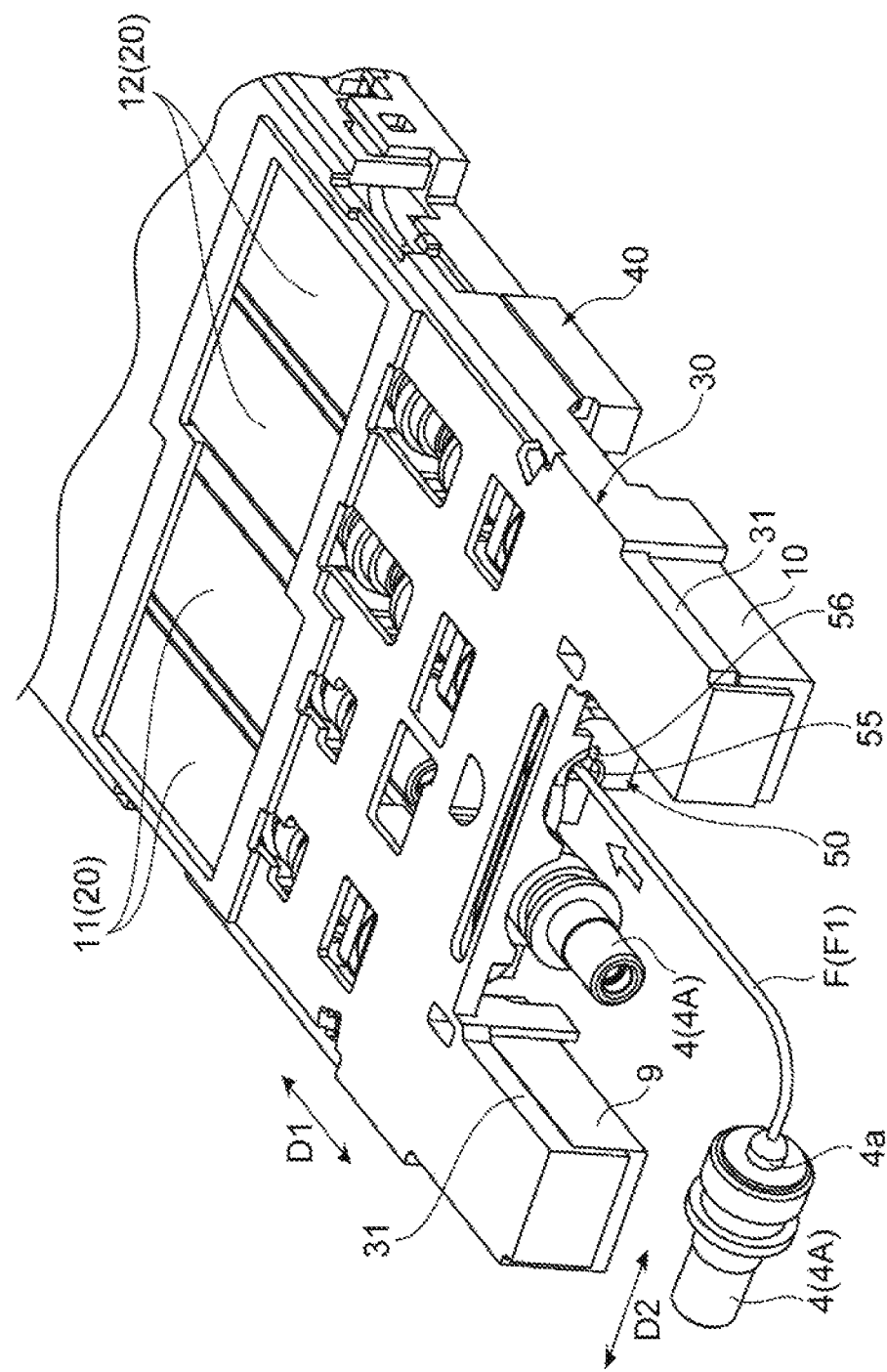
FIG. 17 is a perspective view showing an example in which the sleeve is retained on the retaining part of the second support member in FIG. 16.

As shown in FIG. 17, the protrusion 4a of the sleeve 4A connected to the end portion of the internal fiber F (the first internal fiber F1) is inserted into the retaining part 50 of the second support member 40 to retain the sleeve 4A. More specifically, the protrusion 4a is pressed into the notch 55 along the direction D1, the notch 55 is widened to sandwich the protrusion 4a in the notch 55, and the sleeve 4A is retained on (lightly fixed to) the retaining part 50 of the second support member 40. The sleeve 4A is retained on this retaining part 50, and the sleeve 4A is positioned in the direction D1 and in the direction D2.

Figure 18:
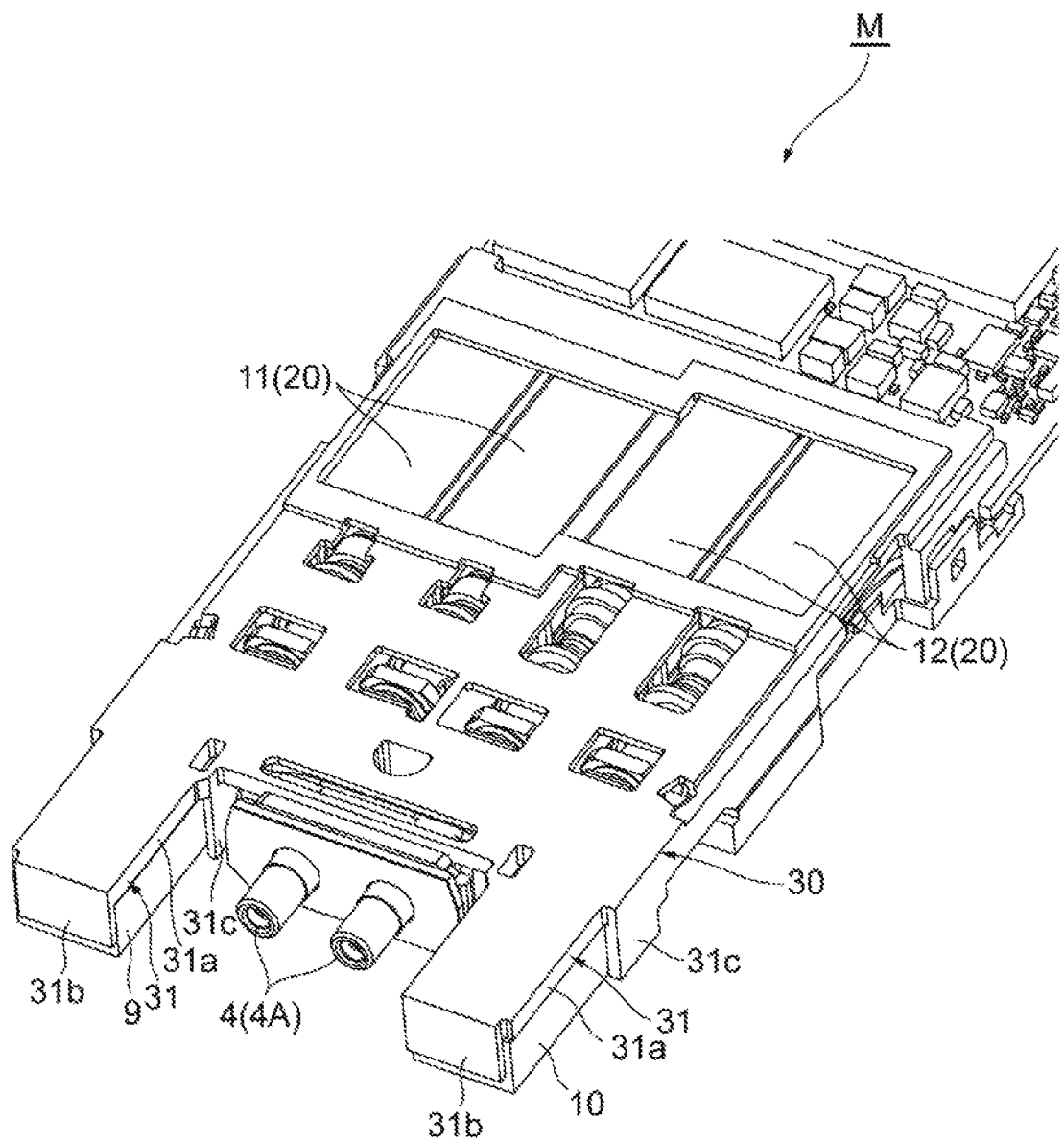
FIG. 18 is a perspective view showing an intermediate assembly that is assembled with the optical-multiplexer (optical-demultiplexer) temporarily fixed to the first support member.
Figure 19:
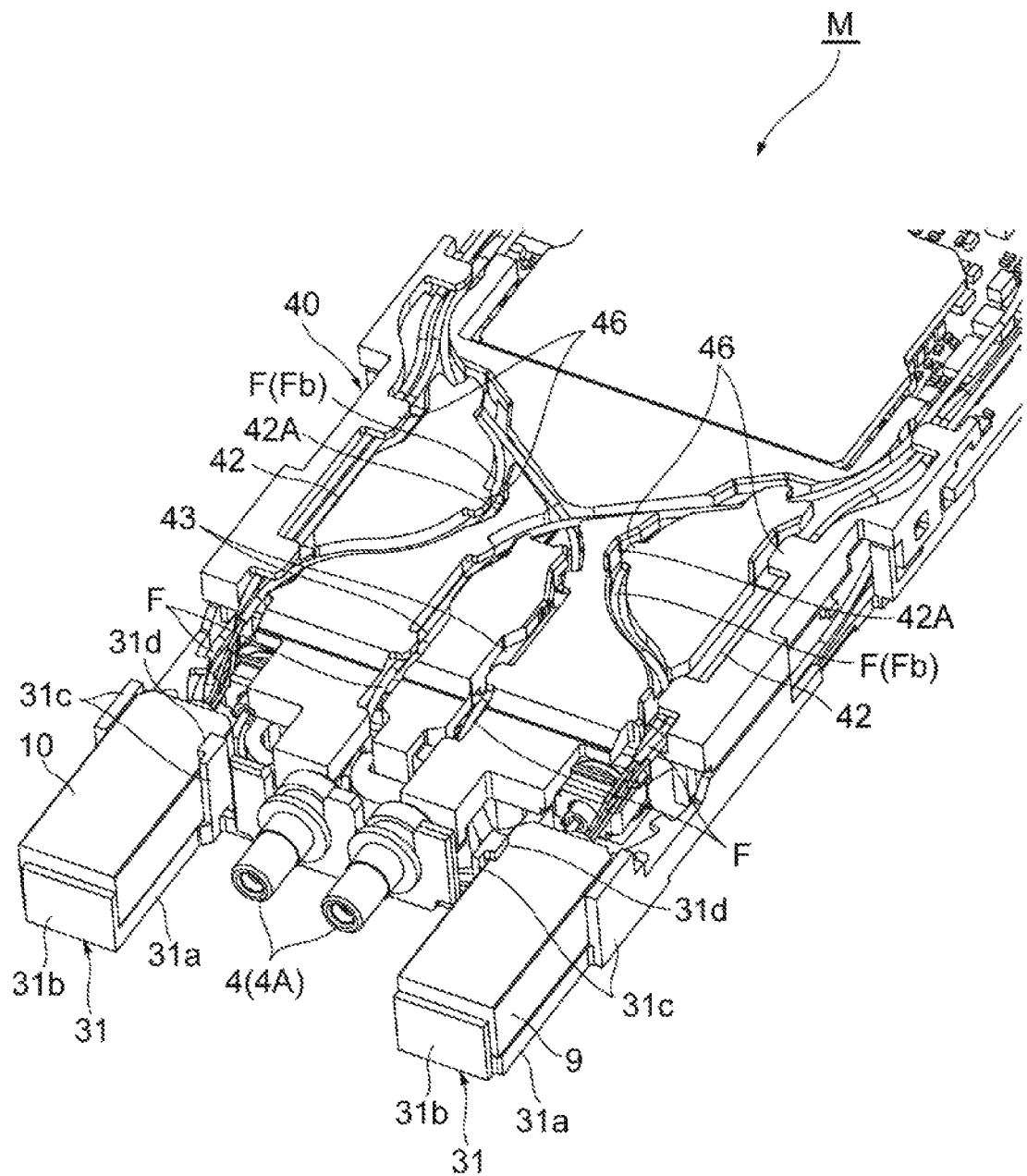
FIG. 19 is a perspective view showing the intermediate assembly assembled with the optical-multiplexer (optical-demultiplexer) temporarily fixed to the first support member viewed from the opposite side in FIG. 18.

As shown in FIGS. 18 and 19, the optical-multiplexer 9 and the optical-demultiplexer 10 are temporarily fixed to the projecting parts 31, and the optical-multiplexer 9 and the optical-demultiplexer 10 are retained by the first support member 30. At this time, the optical-multiplexer 9 and the optical-demultiplexer 10 are placed on the projecting pieces 31a of the projecting parts 31, and sandwiched between the bent part 31b and the wall part 31c, and the optical-multiplexer 9 and the optical-demultiplexer 10 are temporarily fixed on the projecting part 31. The internal fiber F extending from the sleeve 4A is housed in the groove 43, and the internal fibers F optically coupled to the optical-multiplexer 9 and the optical-demultiplexer 10 are housed in the grooves 42.

Figure 20:
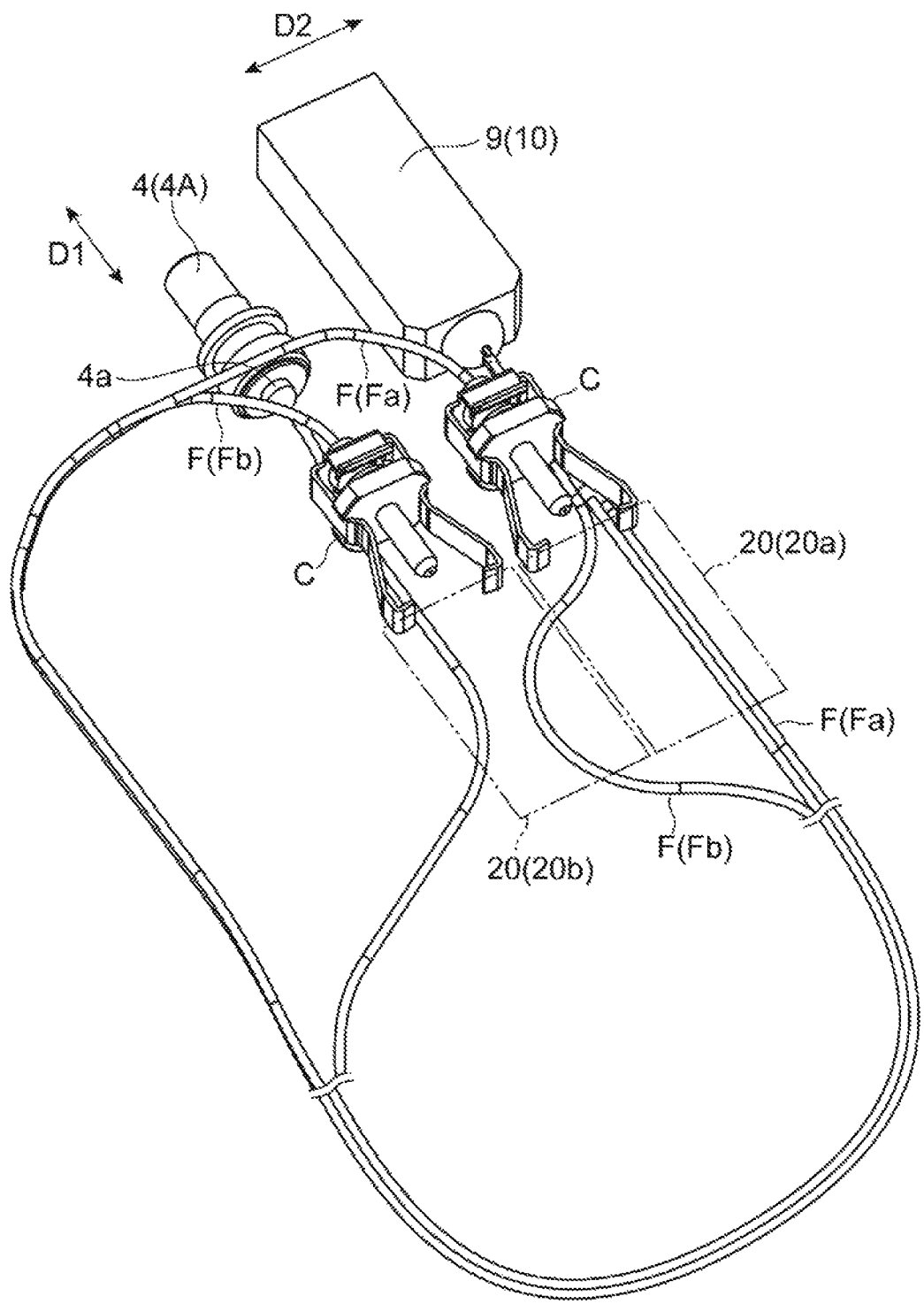
FIG. 20 is a perspective view showing a part of the disposition of the internal fiber in the intermediate assembly in FIG. 19.

FIG. 20 is a perspective view showing the internal fiber F that is inserted into the groove 42. FIG. 20 shows the optical-multiplexer 9 (the optical-demultiplexer 10), the internal fiber F, and the simple connector C and a part of the sleeve 4A connected to the OSA 20 alone, and the OSA 20 is omitted in FIG. 20. As shown in FIGS. 19 and 20, when it is assumed that the internal fiber F extending from a first OSA 20*a* (simple connector C) located on the outer side of the optical transceiver 1 in the width direction is an internal fiber Fa and the internal fiber F extending from a second OSA 20*b* located on the inner side of the optical transceiver 1 in the width direction is an internal fiber Fb, the internal fiber Fa joins the internal fiber Fb, and then is routed together with the internal fiber Fb.

When it is assumed that the path on which the internal fiber Fa is routed after joining the internal fiber Fb is the same as the path on which the internal fiber Fb is routed are the same, since the internal fiber Fa extends from the outer side of the optical transceiver 1 in the width direction, the length of the internal fiber Fa has to be longer than the length of the internal fiber Fb. In this case, since the internal fiber Fa and the internal fiber Fb having different lengths have to be prepared, this leads to the time and effort for assembly and to an increase in costs as well. Note that such a difference between the length of the internal fiber Fa and the length of the internal fiber Fb is due to disposing the first OSA 20*a* and the second OSA 20*b* in parallel in the lateral direction (the longitudinal direction and the vertical direction) to the longitudinal direction of the housing 2.

To this, in the optical transceiver 1, the path in which the internal fiber Fa is routed is not the same as the path in which the internal fiber Fb is routed, and the path for the internal fiber Fb is detoured on the inner side of the optical transceiver 1 in the width direction by the detour 42A of the groove 42. As described above, the path for the internal fiber Fb extending from the second OSA 20*b* located on the inner side of the optical transceiver 1 in the width direction is detoured to the path for the internal fiber Fa extending from the first OSA 20*a*, and thus the length of the internal fiber Fa and the length of the internal fiber Fb can be made the same. Therefore, since the internal fiber Fa and the internal fiber Fb can be used in common, this contributes to easy assembly and a reduction in costs as well.

As described above, the assembly in which the internal fiber F is inserted into the groove 42 of the second support member 40 is performed on the outside of the housing 2. Thus, the intermediate assembly M including the circuit board 13, the OSA 20, the simple connector C, the first support member 30, the second support member 40, the optical-multiplexer 9, and the optical-demultiplexer 10 can be assembled on the outside of the housing 2. After the intermediate assembly M is assembled, the intermediate assembly M is installed on the upper housing 7.

The sleeve 4A retained on the retaining part 50 of the second support member 40 is installed on the front end, right, left and the center of the upper housing 7, the sleeve 4A is inserted into the hole (circular hole) formed on the upper housing 7 in the direction D1, and a part of the sleeve 4A is projected from the hole of the upper housing 7 frontward. That is, the upper housing 7 has the holes through which the transmission sleeve and the reception sleeve penetrate. At this time, the sleeve 4A is retained in advance on the retaining part 50 and positioned in the direction D1 and in the direction D2. Thus, when the sleeve 4A is inserted into the hole of the upper housing 7, the positions of the sleeve 4A in the direction D1 and in the direction D2 to the upper housing 7 are automatically determined. As described above, the sleeve 4A is inserted into the hole of the upper housing 7, the housing 2 is assembled, and then the assembly of the optical transceiver 1 is completed.

Next, the operation and effect obtained from the optical transceiver 1 will be described in detail. In the optical transceiver 1, after the optical receptacle 4 is accepted in the external optical connector, the light beam of the external optical connector is coupled to the optical-multiplexer/demultiplexer and a plurality of OSAs 20. The optical-multiplexer/demultiplexer is optically coupled to the plurality of OSAs 20 individually through the plurality of individual internal fibers F. The housing 2 (the upper housing 7) has a hole through which the sleeve 4A of the optical receptacle 4 is passed, and the sleeve 4A that is the transmission sleeve or the reception sleeve has the protrusion 4*a* to which the internal fiber F is connected.

For example, as shown in FIG. 17, the optical transceiver 1 includes the second support member 40 that retains the plurality of OSAs 20 on the circuit board 13. The second support member 40 has the retaining part 50 that retains the protrusions 4*a* of the sleeves 4A and determines the positions of the sleeves 4A to the housing 2. Therefore, since the protrusions 4*a* of the sleeves 4A are retained on the retaining part 50 of the second support member 40 before the housing 2 is assembled, the event that the internal fiber F is pulled due to retaining the protrusions 4*a* of the sleeves 4A to which the internal fiber F is connected can be avoided. Therefore, the protrusion 4*a* is retained on the retaining part 50, this can avoid the event that the internal fiber F is pulled in assembly of the optical transceiver 1, and thus breaking the optical fiber in assembly can be suppressed. The retaining part 50 retains the protrusions 4*a* of the sleeves 4A, and determines the positions of the sleeves 4A to the housing 2, and thus the sleeves 4A can be positioned to the housing 2 can be easily highly accurately using the protrusion 4*a*.

In the optical transceiver 1 according to the present embodiment, the retaining part 50 has the notch 55 into which the protrusions 4*a* of the transmission sleeve and the reception sleeve (the sleeves 4A) are fit, and the notch 55 is in an arc shape whose central angle $\theta$ is 180° or more. Therefore, the protrusions 4*a* of the sleeves 4A are fit into the notch 55 of the retaining part 50, and thus the sleeves 4A can be easily retained. Therefore, the assembly of the optical transceiver 1 can be efficiently performed.

The optical transceiver 1 according to the present embodiment has the slit 56 that extends from the notch 55 in an arc shape in the direction in which the notch 55 is made deeper. Therefore, when the protrusion 4*a* is fit into the notch 55, the notch 55 can be easily bent by the slit 56. Therefore, the protrusion 4*a* can be easily fit into the notch 55, and thus the assembly of the optical transceiver 1 can be more efficiently performed.

As described above, the embodiment of the optical transceiver according to the present disclosure is described. However, the present invention is not limited to the embodiment described above. That is, a person skilled in the art easily recognizes that various modifications and alterations are possible in the scope of the gist of the present invention described in claims. For example, the shapes of the first support member 30 and the second support member 40 can be appropriately changed. Instead of the first support member 30 and the second support member 40, one support member may be included. Moreover, the order of the assembly of the optical transceiver can be appropriately changed.

In the foregoing embodiment, the notch 55 having the slit 56 is described. However, the shape, size, and disposition forms of the notch can be appropriately changed, and the notch may be a notch that has no slit, for example. In the foregoing embodiment, the retaining part 50 having the first projecting part 51, the second projecting part 52, and the notch 55 is described. However, the shape, size, and disposition forms of the retaining part can be appropriately changed. For example, the retaining part may be a retaining part in a shape different from a notch, or may be a retaining part in the shape of the retaining part 50.

In the foregoing embodiment, the optical transceiver 1 is described including the veil 5 that is rotated in the longitudinal direction and in the vertical direction on the right and left sides of the housing 2. However, instead of the veil 5, an optical transceiver may have a pull-tab (handle) extending from the housing frontward. Also in this case, the effect similar to ones described above can be obtained. As described above, the configurations of the components of the optical transceiver can be appropriately changed.

What is claimed is:

1. An optical transceiver comprising:
    a plurality of optical sub-assemblies configured to perform photoelectric conversions from incoming optical signals to incoming electrical signals, and/or to perform photoelectric conversions from outgoing electrical signals to outgoing optical signals;
    a circuit board electrically connected to the plurality of the optical sub-assemblies;
    an optical receptacle having a transmission sleeve and a reception sleeve, the transmission sleeve being configured to transmit an outgoing wavelength division multiplexing (WDM) signal, the reception sleeve being configured to receive an incoming WDM signal;
    a WDM module having a plurality of first internal fibers and a plurality of second internal fibers, the WDM module being optically coupled to the optical receptacle through the plurality of the first internal fibers and optically coupled to the plurality of optical sub-assemblies through the plurality of second internal fibers, the WDM module being configured to multiplex the outgoing optical signals to the outgoing WDM signal, and/or to demultiplex the incoming WDM signal to the incoming optical signals;
    a support member configured to support the plurality of optical sub-assemblies and to be fixed to the circuit board; and
    a housing including the plurality of optical sub-assemblies, the circuit board, the optical receptacle, the WDM module, and the support member;
    wherein the transmission sleeve and the reception sleeve have respective protrusions coupled to the plurality of first internal fibers in one to one,
    wherein the housing has holes configured to allow the transmission sleeve and the reception sleeve for being inserted to the housing,
    wherein the support member has a retaining part configured to retain the protrusions of the transmission sleeve and the reception sleeve for positioning the transmission sleeve and the reception sleeve,
    wherein the support member has arc-shaped gripping parts configured to grip the respective protrusions of the transmission sleeve and the reception sleeve, and
    wherein each arc-shaped gripping part has an arch with a central angle larger than 180 degrees.

2. The optical transceiver according to claim 1,
    wherein the transmission sleeve and the reception sleeve have respective optical axes,
    wherein the protrusions extend along a first direction parallel to the optical axes.

3. The optical transceiver according to claim 2,
    wherein the protrusions has a columnar shape with a center line parallel to at least one of the optical axes.

4. The optical transceiver according to claim 1,
    wherein the transmission sleeve and the reception sleeve have external ends configured to respectively receive optical connectors and internal ends opposite to the external ends, the internal ends having the protrusions.

5. The optical transceiver according to claim 1,
    wherein each arc-shaped gripping part further has an excavation at a midpoint of the arch.

6. The optical transceiver according to claim 5,
    wherein the excavation divides the arch of the arc-shaped gripping part into a first arc and a second arc, the second arc having a curvature equal to a curvature of the first arc.

* * * * *